US010760698B2

(12) United States Patent
Park

(10) Patent No.: US 10,760,698 B2
(45) Date of Patent: Sep. 1, 2020

(54) COUPLING SEAL HAVING RAMP SURFACES

(71) Applicant: Victaulic Company, Easton, PA (US)

(72) Inventor: Yang Bae Park, Easton, PA (US)

(73) Assignee: Victaulic Company, Easton, PA (US)

( * ) Notice: Subject to any disclaimer, the term of this patent is extended or adjusted under 35 U.S.C. 154(b) by 0 days.

(21) Appl. No.: 15/355,536

(22) Filed: Nov. 18, 2016

(65) Prior Publication Data

US 2017/0146171 A1  May 25, 2017

Related U.S. Application Data

(60) Provisional application No. 62/258,797, filed on Nov. 23, 2015.

(51) Int. Cl.
| *F16K 1/22* | (2006.01) |
| *F16K 27/02* | (2006.01) |
| *F16L 29/00* | (2006.01) |
| *F16K 27/00* | (2006.01) |
| *F16K 1/20* | (2006.01) |
| *F16L 21/03* | (2006.01) |

(Continued)

(52) U.S. Cl.
CPC ............ *F16K 27/00* (2013.01); *F16K 1/2028* (2013.01); *F16K 1/2057* (2013.01); *F16K 1/22* (2013.01); *F16K 1/224* (2013.01); *F16K 1/2263* (2013.01); *F16K 27/0218* (2013.01); *F16L 19/0206* (2013.01); *F16L 21/03* (2013.01); *F16L 29/00* (2013.01); *F16L 29/007* (2013.01)

(58) Field of Classification Search
CPC ....... B23P 19/00; F16L 19/0206; F16L 21/03; F16L 23/08; F16L 29/00; F16L 29/007; F16K 27/00; F16K 1/22; F16K 1/226; F16K 1/2263; F16K 27/0218
USPC .......................................... 251/306, 305, 314
See application file for complete search history.

(56) References Cited

U.S. PATENT DOCUMENTS

| 809,746 A | 1/1906 | Rhoads |
| 2,853,318 A | 9/1958 | Smith |

(Continued)

FOREIGN PATENT DOCUMENTS

| CA | 2573159 C | 2/2010 |
| FR | 2237111 | 2/1975 |

(Continued)

OTHER PUBLICATIONS

Copenheaver, Blaine R.; International Search Report from counterpart International Patent Application No. PCT/US2016/062761, dated Jan. 19, 2017, pp. 1-2; United States Patent and Trademark Office as Searching Authority, Alexandria, Virginia USA.

(Continued)

*Primary Examiner* — Kelsey E Cary
(74) *Attorney, Agent, or Firm* — Ballard Spahr LLP

(57) ABSTRACT

A seal for a coupling joining pipe elements has angularly oriented ramp surfaces on an outer surface. The ramp surfaces are arranged in diametrically opposite pairs which are positioned at the three o'clock and nine o'clock positions at the interface between segments forming the coupling. The ramps are expected to mitigate pinching of the seals between the segments as the segments are drawn together, compressing the seals to form a fluid tight pipe joint.

32 Claims, 16 Drawing Sheets

(51) Int. Cl.
*F16K 1/226* (2006.01)
*F16L 19/02* (2006.01)

(56) References Cited

U.S. PATENT DOCUMENTS

| | | | |
|---|---|---|---|
| 3,153,550 | A | 10/1964 | Hollett |
| 3,329,446 | A | 7/1967 | Katis et al. |
| 3,362,730 | A | 1/1968 | St. Clair |
| 3,479,066 | A | 11/1969 | Gittleman |
| 4,417,755 | A | 11/1983 | Gittleman |
| 4,563,025 | A | 1/1986 | Poe |
| 4,611,835 | A | 9/1986 | Gittleman |
| 4,678,208 | A | 7/1987 | De Raymond |
| 5,018,548 | A | 5/1991 | McLennan |
| 7,472,911 | B2 | 1/2009 | Sun et al. |
| 9,726,310 | B2 * | 8/2017 | Gibb ............... F16L 17/04 |
| 10,100,954 | B2 | 10/2018 | Lippka |
| 2011/0062706 | A1 | 3/2011 | Henry |
| 2011/0115216 | A1 | 5/2011 | Dole et al. |
| 2016/0348800 | A1 | 12/2016 | Abouelleil et al. |

FOREIGN PATENT DOCUMENTS

| | | |
|---|---|---|
| GB | 2098297 | 11/1982 |
| JP | H0385775 | 8/1991 |
| WO | 2017091461 | 6/2017 |

OTHER PUBLICATIONS

Copenheaver, Blaine R.; Written Opinion from counterpart International Patent Applicatoin No. PCT/US2016/062761, dated Jan. 19, 2017, pp. 1-6; United States Patent and Trademark Office as Searching Authority, Alexandria, Virginia USA.

* cited by examiner

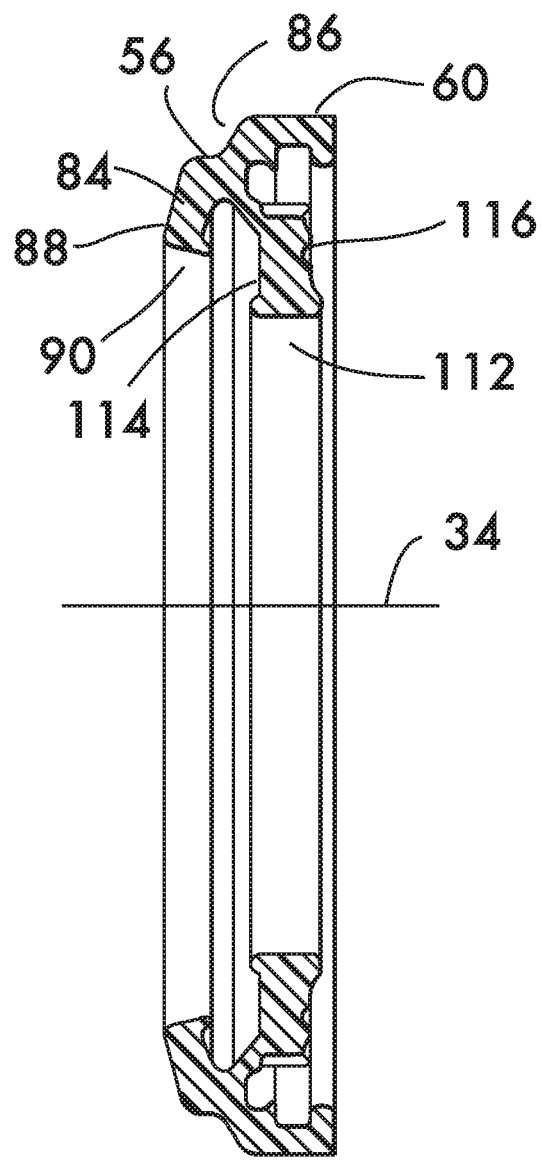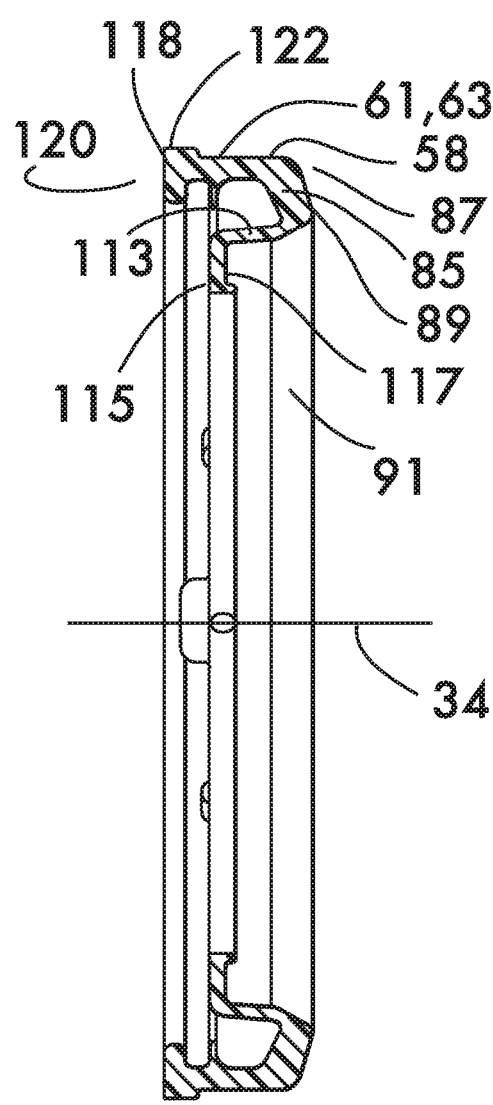

COUPLING SEAL HAVING RAMP SURFACES

CROSS REFERENCE TO RELATED APPLICATION

This application is based upon and claims priority to U.S. Provisional Application No. 62/258,797, filed Nov. 23, 2015 and hereby incorporated by reference.

FIELD OF THE INVENTION

This invention relates to seals for fluid control devices such as mechanical couplings and valves incorporating mechanical couplings.

BACKGROUND

Mechanical pipe couplings according to the prior art comprise a plurality of segments joined end to end and surrounding a ring seal which forms a fluid tight joint between the pipe elements. The ring seal has an outer circumferential surface which engages an inner surface of the segments. Lobes are positioned on opposite sides of the ring seal. The lobes have radially facing sealing surfaces that engage the pipe elements. The ring seal is compressed between the segments and the pipe elements to effect the fluid tight joint. When the segments are drawn toward one another to compress the seals against the pipe elements the segments can pinch the seals and or cause undesirable distortion of the seals at the interface between the segments. This can damage the seals, resulting in leakage or poor pressure performance. There is clearly an advantage to avoiding or mitigating pinching of seals during the formation of pipe joints using mechanical couplings.

SUMMARY

The invention concerns a seal. In one example embodiment the seal comprises an outer ring surrounding an axis oriented coaxially with the outer ring. The outer ring has an outer surface facing away from the axis. First and second ramp surfaces are positioned adjacent to one another on the outer surface. The first and second ramp surfaces are contiguous along a first apex projecting outwardly from the outer surface. The first and second ramp surfaces are angularly oriented with respect to a first line extending radially from the axis to the first apex.

An example embodiment further comprises third and fourth ramp surfaces positioned adjacent to one another on the outer surface. The third and fourth ramp surfaces are contiguous along a second apex projecting outwardly from the outer surface. The third and fourth ramp surfaces are angularly oriented with respect to a second line extending radially from the axis to the second apex. In an example embodiment the first and second apexes are diametrically opposite to one another. An example embodiment further comprises a lobe extending circumferentially around a first side of the outer ring. The lobe has an outer surface facing away from the axis and a sealing surface facing toward the axis. An example embodiment further comprises fifth and sixth ramp surfaces positioned adjacent to one another on the outer surface of the lobe. The fifth and sixth ramp surfaces are contiguous along a third apex projecting from the outer surface of the lobe. The fifth and sixth ramp surfaces are angularly oriented with respect to a third line extending radially from the axis to the third apex. In a specific example embodiment the first and third apexes are aligned with one another.

An example embodiment further comprises seventh and eighth ramp surfaces positioned adjacent to one another on the outer surface of the lobe. The seventh and eighth ramp surfaces are contiguous along a fourth apex projecting from the outer surface of the lobe. The seventh and eighth ramp surfaces are angularly oriented with respect to a fourth line extending radially from the axis to the fourth apex. In a specific example embodiment the second and fourth apexes are aligned with one another.

An example, embodiment further comprises a rim extending circumferentially around a side of the outer ring opposite the lobe. The rim has an outer surface facing away from the axis and offset from the outer surface of the outer ring. Ninth and tenth ramp surfaces are positioned adjacent to one another on the outer surface of the rim. The ninth and tenth ramp surfaces are contiguous along a fifth apex projecting from the outer surface of the rim. The ninth and tenth ramp surfaces are angularly oriented with respect to a fifth line extending radially from the axis to the fifth apex.

A further example embodiment comprises eleventh and twelfth ramp surfaces positioned adjacent to one another on the outer surface of the rim. The eleventh and twelfth ramp surfaces are contiguous along a sixth apex projecting from the outer surface of the rim. The eleventh and twelfth ramp surfaces are angularly oriented with respect to a sixth line extending radially from the axis to the sixth apex. In a specific example embodiment the fifth and sixth apexes are diametrically opposite one another. In a particular example embodiment the fifth apex is aligned with the first apex and the sixth apex is aligned with the second apex.

Another example embodiment comprises an inner ring positioned between the outer ring and the axis. The inner ring is attached between the outer ring and the lobe and defining oppositely facing surfaces oriented perpendicular to the axis. An example embodiment further comprises an inner ring positioned between the outer ring and the axis. The inner ring is attached to the lobe and defines oppositely facing surfaces oriented perpendicular to the axis.

The invention also encompasses a seal, comprising an outer ring surrounding an axis oriented coaxially with the outer ring. The outer ring has an outer surface facing away from the axis. First and second ramp surfaces are positioned adjacent to one another on the outer surface. The first and second ramp surfaces are contiguous along a first apex projecting outwardly from the outer surface. The first and second ramp surfaces are angularly oriented with respect to a first line extending radially from the axis to the first apex. Third and fourth ramp surfaces are positioned adjacent to one another on the outer surface. The third and fourth ramp surfaces are contiguous along a second apex projecting outwardly from the outer surface. The third and fourth ramp surfaces are angularly oriented with respect to a second line extending radially from the axis to the second apex. The first and second apexes are diametrically opposite to one another in a specific example embodiment.

Another example embodiment comprises a lobe extending circumferentially around a first side of the outer ring. The lobe has an outer surface facing away from the axis and a sealing surface facing toward the axis. Fifth and sixth ramp surfaces are positioned adjacent to one another on the outer surface of the lobe. The fifth and sixth ramp surfaces are contiguous along a third apex projecting from the outer surface of the lobe. The fifth and sixth ramp surfaces are angularly oriented with respect to a third line extending radially from the axis to the third apex. Seventh and eighth ramp surfaces are positioned adjacent to one another on the outer surface of the lobe. The seventh and eighth ramp surfaces are contiguous along a fourth apex projecting from the outer surface of the lobe. The seventh and eighth ramp surfaces are angularly oriented with respect to a fourth line extending radially from the axis to the fourth apex.

In an example embodiment the first and third apexes are aligned with one another and the second and fourth apexes are aligned with one another. Another example embodiment comprises a rim extending circumferentially around a side of the outer ring opposite the lobe. The rim has an outer surface facing away from the axis and offset from the outer surface of the outer ring. Ninth and tenth ramp surfaces are positioned adjacent to one another on the outer surface of the rim. The ninth and tenth ramp surfaces are contiguous along a fifth apex projecting from the outer surface of the rim. The ninth and tenth ramp surfaces are angularly oriented with respect to a fifth line extending radially from the axis to the fifth apex. Eleventh and twelfth ramp surfaces are positioned adjacent to one another on the outer surface of the rim. The eleventh and twelfth ramp surfaces are contiguous along a sixth apex projecting from the outer surface of the rim. The eleventh and twelfth ramp surfaces are angularly oriented with respect to a sixth line extending radially from the axis to the sixth apex. The fifth and sixth apexes are diametrically opposite one another in a specific example embodiment. In a further example embodiment the third and fifth apexes are aligned with the first apex and the fourth and sixth apexes are aligned with the second apex.

A further example embodiment comprises an inner ring positioned between the outer ring and the axis. The inner ring is attached between the outer ring and the lobe and defining oppositely facing surfaces oriented perpendicular to the axis. An example embodiment further compriss an inner ring positioned between the outer ring and the axis. The inner ring is attached to the lobe and defining oppositely facing surfaces oriented perpendicular to the axis.

The invention further encompasses, in combination, a seal and a coupling for joining pipe elements. In one example embodiment the seal comprises an outer ring surrounding an axis oriented coaxially with the outer ring. The outer ring has an outer surface facing away from the axis. First and second ramp surfaces are positioned adjacent to one another on the outer surface. The first and second ramp surfaces are contiguous along a first apex projecting outwardly from the outer surface. The first and second ramp surfaces are angularly oriented with respect to a first line extending radially from the axis to the first apex. Third and fourth ramp surfaces are positioned adjacent to one another on the outer surface. The third and fourth ramp surfaces are contiguous along a second apex projecting outwardly from the outer surface. The third and fourth ramp surfaces are angularly oriented with respect to a second line extending radially from the axis to the second apex. The first and second apexes are diametrically opposite to one another in an example embodiment. In an example embodiment the coupling comprises a plurality of segments attached to one another end to end surrounding the seal. Each segment has attachment members located at opposite ends. Each the segment has arcuate surfaces positioned on opposite sides thereof for engagement with the pipe elements.

In a specific example embodiment the attachment members comprise lugs extending outwardly from opposite ends of each the segment. Each lug defines a hole for receiving a fastener. By way of example the arcuate surfaces project from the segments radially toward the axis.

In an example embodiment the combination further comprises a lobe extending circumferentially around a first side of the outer ring. The lobe has an outer surface facing away from the axis and a sealing surface facing toward the axis for engagement with one of the pipe elements. Fifth and sixth ramp surfaces are positioned adjacent to one another on the outer surface of the lobe. The fifth and sixth ramp surfaces are contiguous along a third apex projecting from the outer surface of the lobe. The fifth and sixth ramp surfaces are angularly oriented with respect to a third line extending radially from the axis to the third apex. Seventh and eighth ramp surfaces are positioned adjacent to one another on the outer surface of the lobe. The seventh and eighth ramp surfaces are contiguous along a fourth apex projecting from the outer surface of the lobe. The seventh and eighth ramp surfaces are angularly oriented with respect to a fourth line extending radially from the axis to the fourth apex.

In a particular example embodiment the first and third apexes are aligned with one another and the second and fourth apexes are aligned with one another. By way of example the combination further comprises a rim extending circumferentially around a side of the outer ring opposite the lobe. The rim has an outer surface facing away from the axis and offset from the outer surface of the outer ring. Ninth and tenth ramp surfaces are positioned adjacent to one another on the outer surface of the rim. The ninth and tenth ramp surfaces are contiguous along a fifth apex projecting from the outer surface of the rim. The ninth and tenth ramp surfaces are angularly oriented with respect to a fifth line extending radially from the axis to the fifth apex. Eleventh and twelfth ramp surfaces are positioned adjacent to one another on the outer surface of the rim. The eleventh and twelfth ramp surfaces are contiguous along a sixth apex projecting from the outer surface of the rim. The eleventh and twelfth ramp surfaces are angularly oriented with respect to a sixth line extending radially from the axis to the sixth apex. In a specific embodiment the fifth and sixth apexes are diametrically opposite one another. In a further example embodiment the third and fifth apexes are aligned with the first apex and the fourth and sixth apexes are aligned with the second apex.

Another example embodiment comprises a valve body positioned between the ring and the axis. A valve closing member is positioned within the valve body. The valve closing member is movable between a closed position and an open position. A valve stem is attached to the valve closing member and extends through one of the segments in an example embodiment.

Another example embodiment comprises an inner ring positioned between the outer ring and the axis. The inner ring is attached between the outer ring and the lobe and defines oppositely facing surfaces oriented perpendicular to the axis. One of the oppositely facing surfaces is engageable with an end of one of the pipe elements, the other of the oppositely facing surfaces is engageable with the valve body. In an example embodiment an inner ring is positioned between the outer ring and the axis. The inner ring is attached to said lobe and defines oppositely facing surfaces oriented perpendicular to the axis. One of the oppositely facing surfaces is engageable with an end of one of the pipe elements. The other of the oppositely facing surfaces is engageable with the valve body.

In a specific example embodiment the plurality of segments comprises no more than two the segments. By way of further example each of the segments comprises a back wall extending between the opposite ends. The back wall has an inner surface facing the axis. First and second angularly oriented surfaces are positioned on the inner surface of the back wall at opposite ends of the segments.

BRIEF DESCRIPTION OF THE DRAWINGS

FIG. 4E is cross sectional view taken at line 4E-4E of FIG. 4;

FIG. 5G is cross sectional view taken at line 5G-5G of FIG. 5;

DETAILED DESCRIPTION

Figure 1:
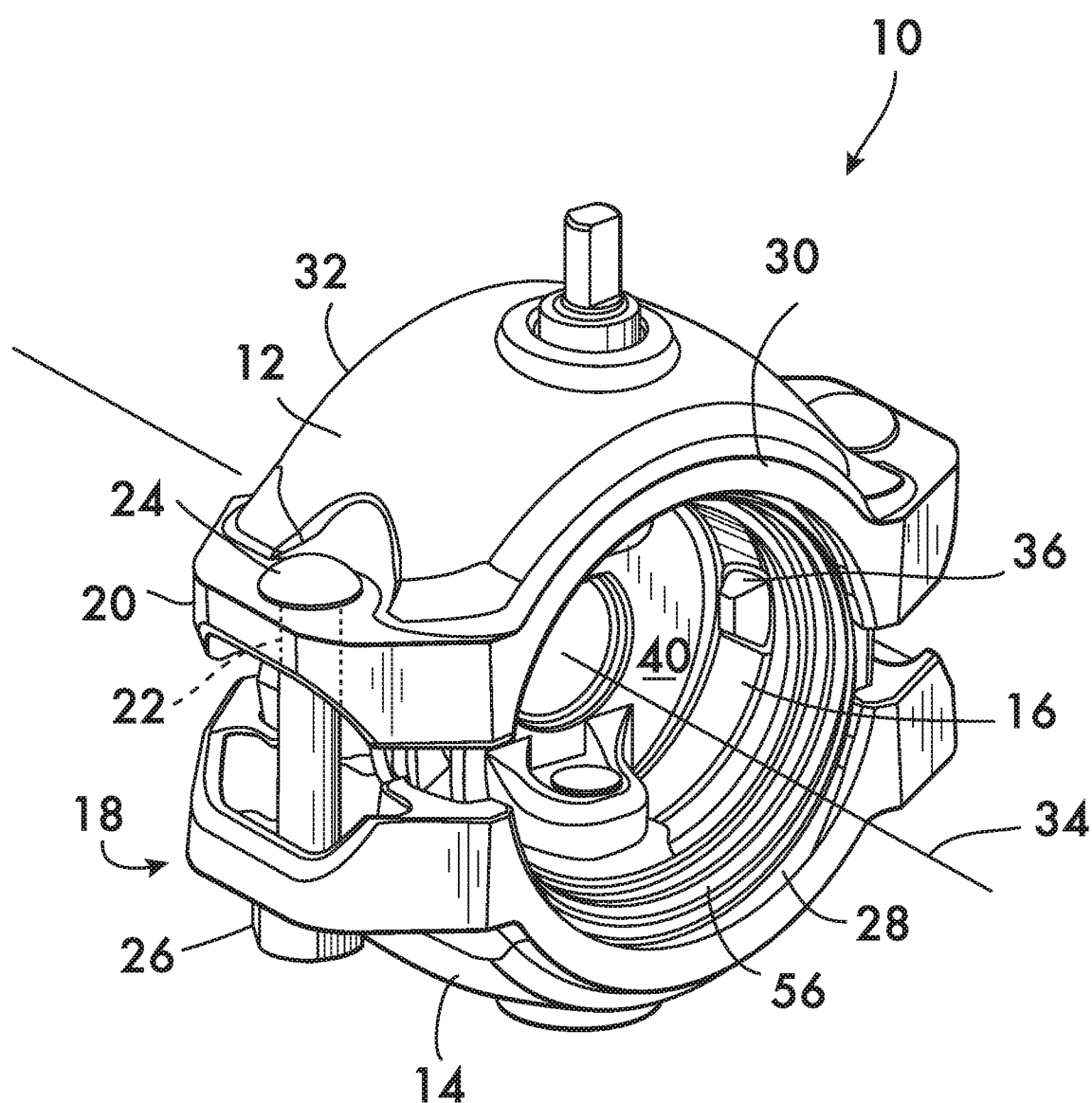
FIG. 1 is an isometric view of an example embodiment of a valve coupling according to the invention, the valve coupling being shown in a pre-assembled state.

FIG. 1 shows an example embodiment of a combination valve and mechanical coupling 10, hereafter referred to as a valve coupling. Valve coupling 10 comprises a plurality of segments, in this example, two segments 12 and 14 attached to one another end to end to surround and define a central space 16. Attachment of segments 12 and 14 is effected by adjustable attachment members 18 located at each end of each segment. In this example the attachment members comprise lugs 20 which extend outwardly from the segments 12 and 14, the lugs having holes 22 that receive adjustable fasteners, such as bolts 24 and nuts 26. Tightening of the nuts 26 draws the segments 12 and 14 toward one another as described below.

Segments 12 and 14 each have arcuate surfaces 28 positioned on opposite sides 30 and 32 of the segments. Arcuate surfaces 28 face a longitudinal axis 34 that passes through the central space 16 and are engageable with pipe elements when they are inserted between the segments 12 and 14 and into central space 16 as described below. As shown, the arcuate surfaces 28 may comprise projections, known as "keys", which project toward axis 34 and engage circumferential grooves in the pipe elements upon tightening of the attachment members 18 to provide mechanical engagement, securing the pipe elements in end to end relation to form a joint. The keys may also engage pipe elements having plain end, or ends having a shoulder and/or a bead as are known in the art.

Figure 2:
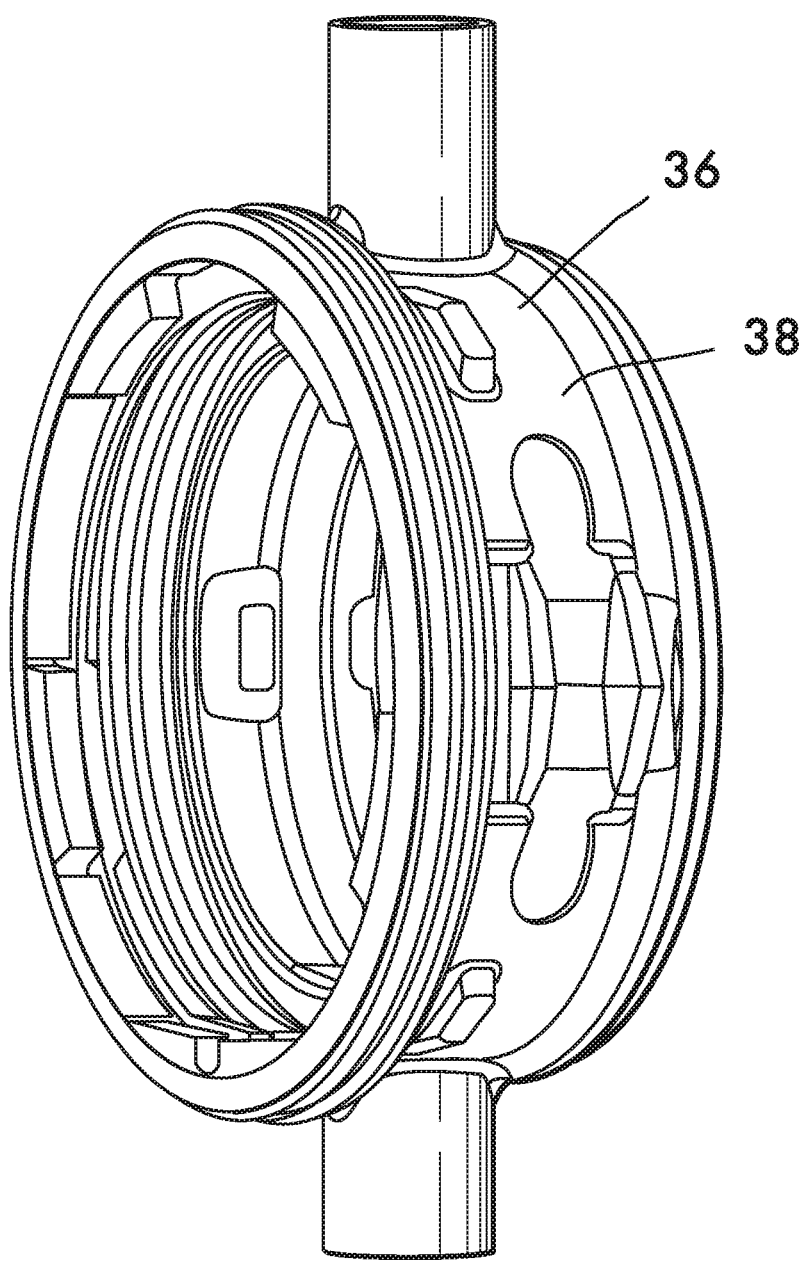
FIG. 2 is an isometric view of an example valve body used with the valve coupling of FIG. 1.
Figure 3:
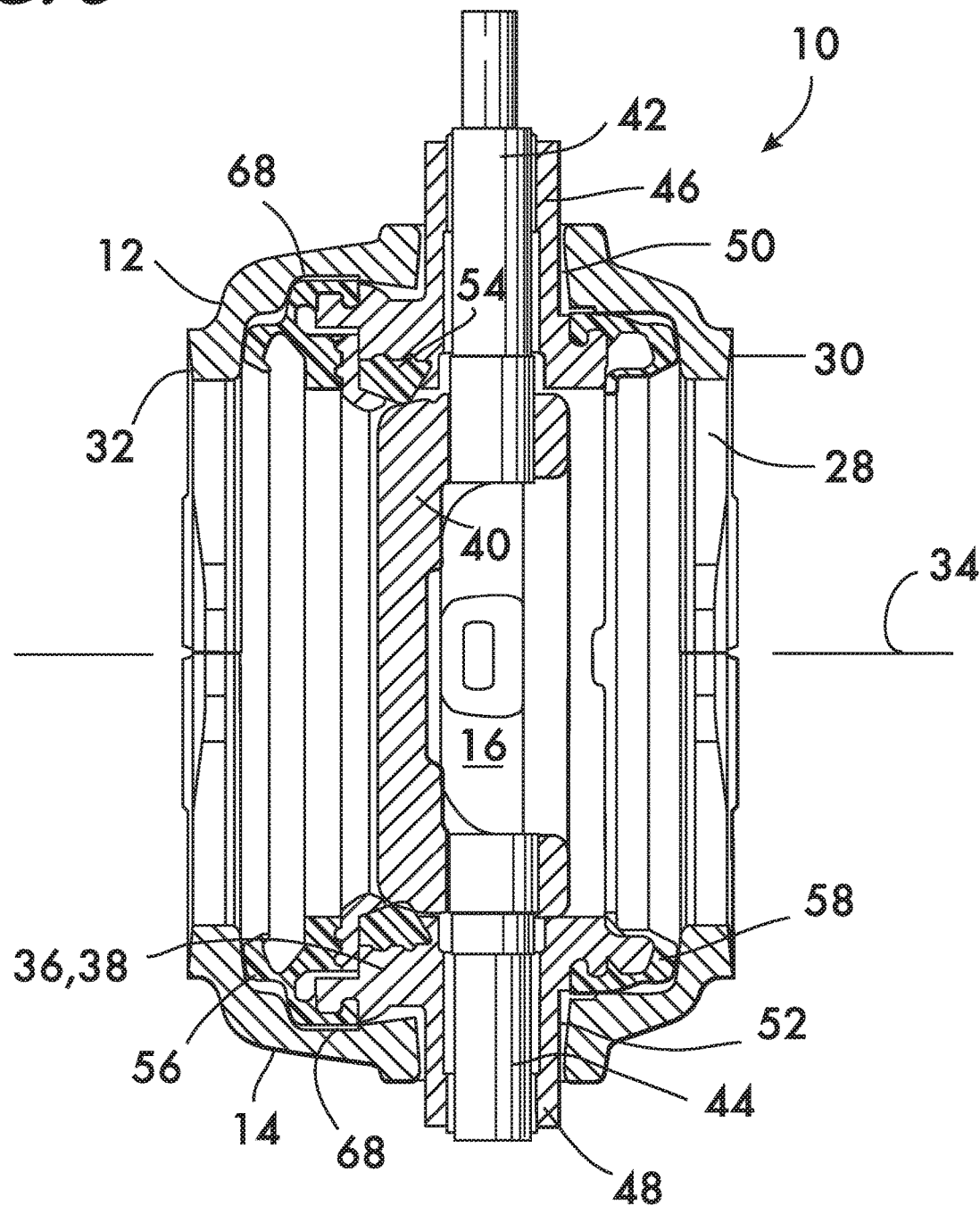
FIG. 3 is a longitudinal sectional view of the valve coupling shown in FIG. 1.

FIGS. 1 and 2 show a valve body 36 that is positioned within central space 16 and captured between segments 12 and 14. Valve body 36 comprises a cylindrical housing 38 in which a valve closing member, in this example a disk 40, is movably mounted. As shown in FIG. 3, disk 40 is rotatably mounted on valve stems 42 and 44 and movable within housing 38 between an open position and a closed position. Stems 42 and 44 are received within respective bonnets 46 and 48 that extend from the housing 38 and comprise bearings for the valve stems. The bonnets 46 and 48 in turn extend through respective openings 50 and 52 in segments 12 and 14. Engagement of bonnets 46 and 48 with segments 12 and 14 where the bonnets protrude through the segments helps to stabilize the valve body 36 within the central space 16. As shown in FIG. 3, a seal 54 is mounted within housing 38. Seal 54 surrounds the central space 16 and provides a seal between the housing 38 and the disk 40 when the disk is in the closed position.

Figure 4:
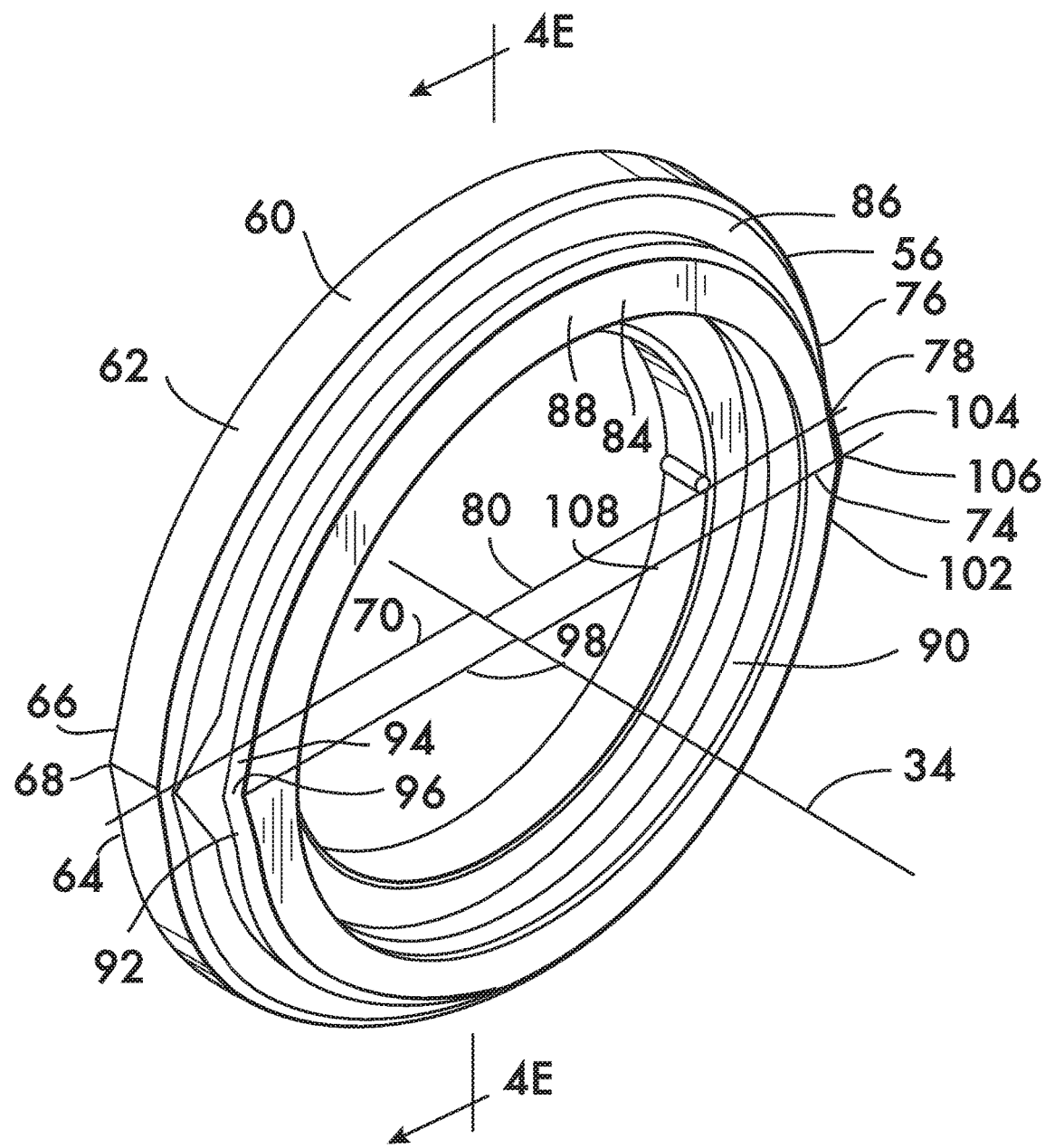
FIG. 4 is an isometric view of an example seal according to the invention.
Figure 5:
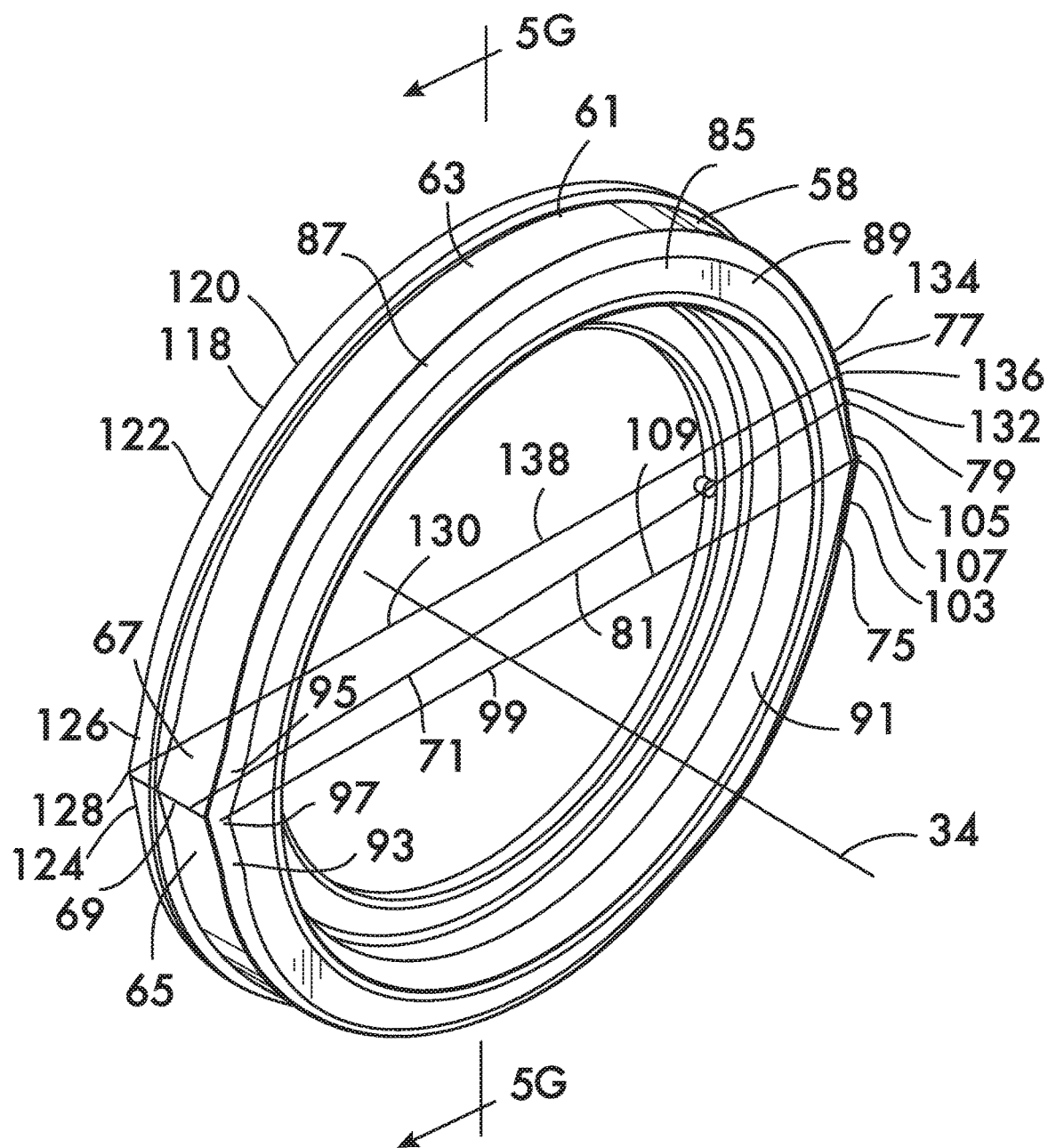
FIG. 5 is an isometric view of an example seal according to the invention.

Additional seals, 56 and 58, shown respectively in FIGS. 4 and 5, are positioned between the segments 12 and 14 and the valve body 36 as shown in FIG. 3. Seals 56 and 58 establish a seal between the segments 12 and 14, the valve body 36 and pipe elements when a joint is created by tightening the attachment members 18 to draw the segments toward one another and engage the pipe elements.

Figure 4A:
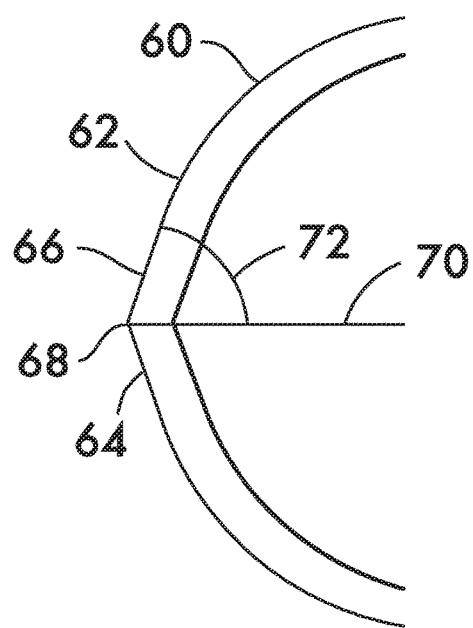
FIGS. 4A-4D are axial views of a portion of the example seal shown in FIG. 4.

As shown in FIG. 4, seal 56 comprises an outer ring 60 which surrounds axis 34, oriented coaxially with the outer ring. Outer ring 60 has an outer surface 62 which faces away from the axis 34. First and second ramp surfaces 64 and 66 are positioned adjacent to one another on outer surface 62. Ramp surfaces 64 and 66 are contiguous along a first apex 68 which extends parallel to axis 34 and projects outwardly from the outer surface 62. As shown in FIG. 4A, ramp surfaces 64 and 66 are angularly oriented with respect to a first line 70 which extends radially from axis 34 to the apex 68. Orientation angles 72 from about 45° to about 90° are feasible, with an orientation angle of about 80° being thought advantageous as explained below.

Figure 4B:
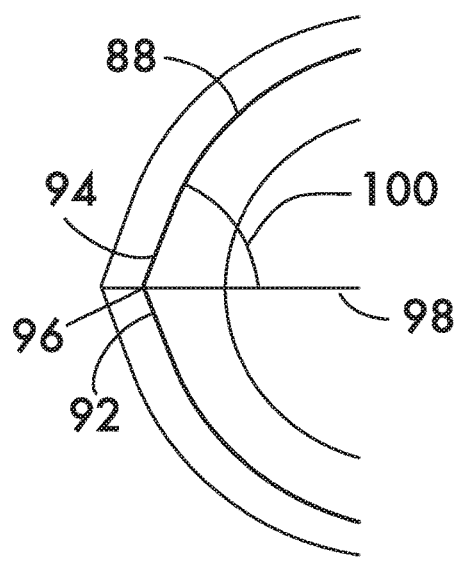
Figure 4C:
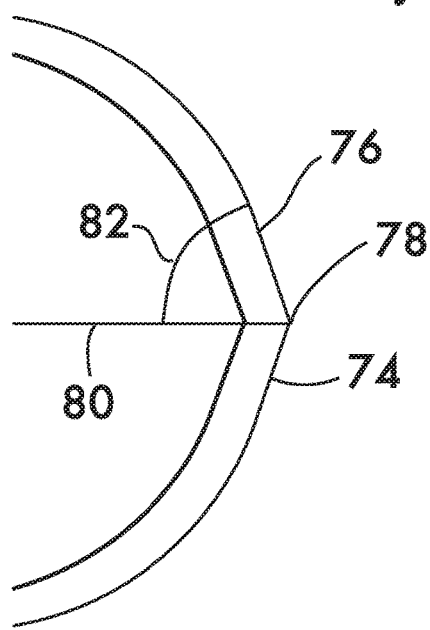

As shown in FIG. 4C, the example seal 56 may also have third and fourth ramp surfaces 74 and 76 positioned adjacent to one another on outer surface 62. Ramp surfaces 74 and 76, are contiguous along a second apex 78 which extends parallel to axis 34 and projects outwardly from the outer surface 62. Ramp surfaces 74 and 76 are angularly oriented with respect to a second line 80 which extends radially from axis 34 to the apex 78. Orientation angles 82 from about 45° to about 90° are feasible, with an orientation angle of about 80° being thought advantageous. In this example embodiment the first and second apexes 68 and 78 are diametrically opposite to one another on outer ring 60 as shown in FIG. 4.

As shown in FIGS. 4 and 4E, seal 56 may further comprise a lobe 84. Lobe 84 extends circumferentially around a first side 86 of the outer ring 60. Lobe 84 has an outer surface 88 which faces away from axis 34 and a sealing surface 90 which faces toward the axis 34. As explained below, sealing surface 90 sealingly engages pipe elements connected by the valve coupling 10. As shown in FIGS. 4 and 4B, fifth and sixth ramp surfaces 92 and 94 may be positioned adjacent to one another on the outer surface 88 of lobe 84. Ramp surfaces 92 and 94 are contiguous along a third apex 96 which projects from the outer surface 88 of lobe 84. Ramp surfaces 92 and 94 are angularly oriented with respect to a third line 98 which extends from axis 34 to the third apex. Orientation angles 100 from about 45° to about 90° are feasible, with an orientation angle of about 74° being thought advantageous.

Figure 4D:
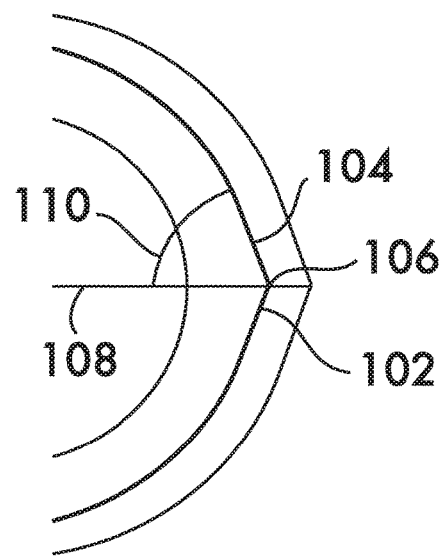

The example seal 56 may also have seventh and eighth ramp surfaces 102 and 104 positioned adjacent to one another on outer surface 88 of lobe 84. As shown in FIGS. 4 and 4D, ramp surfaces 102 and 104 are contiguous along a fourth apex 106 projects outwardly from the outer surface 88. Ramp surfaces 102 and 104 are angularly oriented with respect to a fourth line 108 which extends radially from axis 34 to the apex 106. Orientation angles 110 from about 45° to about 90° are feasible, with an orientation angle of about 74° being thought advantageous. In this example embodiment as shown in FIG. 4, the third and fourth apexes 96 and 106 are diametrically opposite to one another on lobe 84. Further in this example, the first and third apexes 68 and 96 are aligned with one another along axis 34, and the second and fourth apexes 78 and 106 are aligned with one another along axis 34.

As shown in FIG. 4E, seal 56 may further comprise an inner ring 112 positioned between outer ring 60 and axis 34. Inner ring 112 is attached to the seal 56 between the outer ring 60 and the lobe 84 and defines oppositely facing surfaces 114 and 116.

Figure 5A:
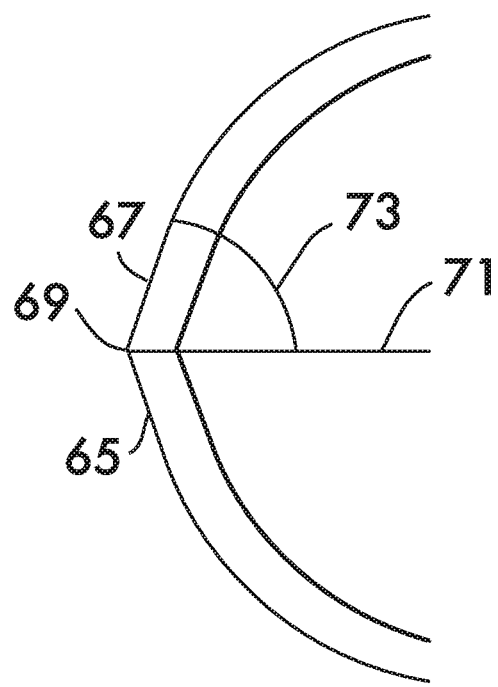
FIGS. 5A-5F are axial views of a portion of the example seal shown in FIG. 4.

As shown in FIG. 5, seal 58 comprises an outer ring 61 which surrounds axis 34, oriented coaxially with the outer ring. Outer ring 61 has an outer surface 63 which faces away from the axis 34. As shown in FIGS. 5 and 5A, first and second ramp surfaces 65 and 67 are positioned adjacent to one another on outer surface 63. Ramp surfaces 65 and 67 are contiguous along a first apex 69 which extends parallel to axis 34 and projects outwardly from the outer surface 63. Ramp surfaces 65 and 67 are angularly oriented with respect to a first line 71 which extends radially from axis 34 to the apex 69. Orientation angles 73 from about 45° to about 90° are feasible, with an orientation angle of about 74° being thought advantageous as explained below.

Figure 5B:
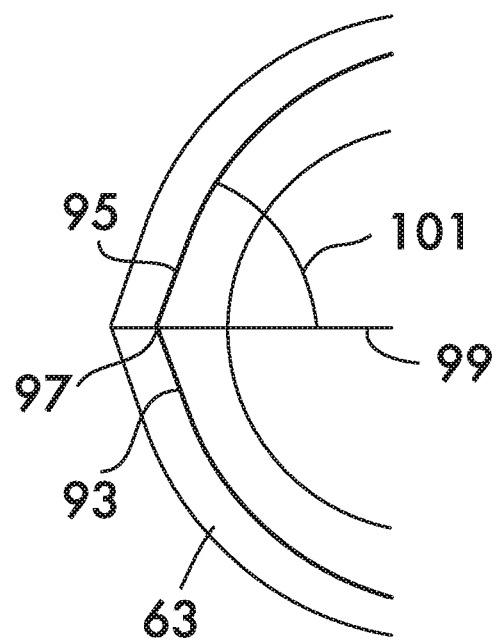
Figure 5C:
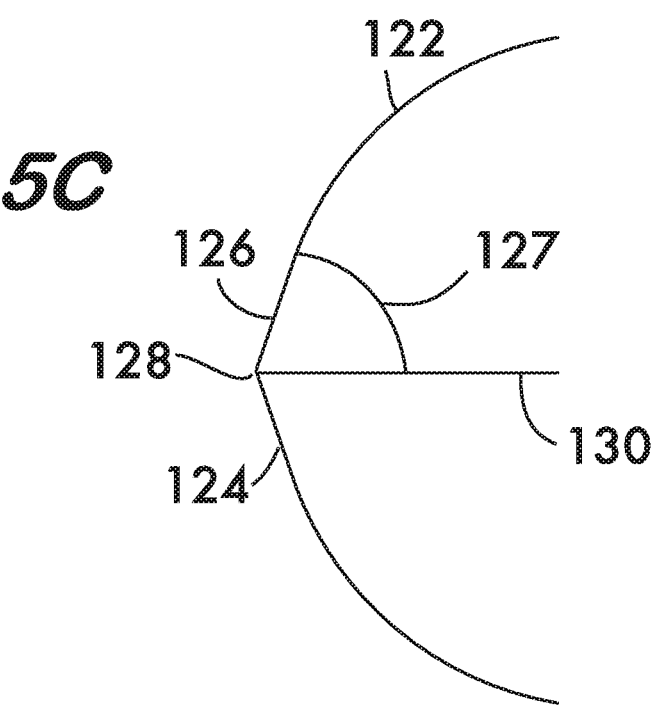
Figure 5D:
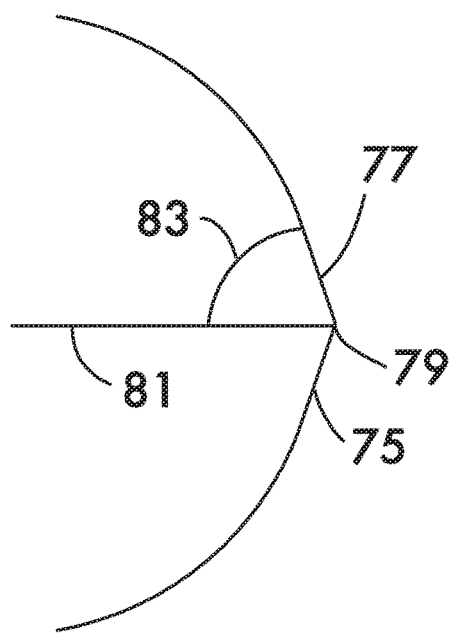

As shown in FIGS. 5 and 5D, the example seal 58 may also have third and fourth ramp surfaces 75 and 77 positioned adjacent to one another on outer surface 63. Ramp surfaces 75 and 77 are contiguous along a second apex 79 which extends parallel to axis 34 and projects outwardly from the outer surface 63. Ramp surfaces 75 and 77 are angularly oriented with respect to a second line 81 which extends radially from axis 34 to the apex 79. Orientation angles 83 from about 45° to about 90° are feasible, with an orientation angle of about 74° being thought advantageous. In this example embodiment the first and second apexes 69 and 79 are diametrically opposite to one another on outer ring 61 as shown in FIG. 5.

As shown in FIGS. 5 and 5G, seal 58 may further comprise a lobe 85. Lobe 85 extends circumferentially around a first side 87 of the outer ring 61. Lobe 85 has an outer surface 89 which faces away from axis 34 and a sealing surface 91 which faces toward the axis 34. As explained below, sealing surface 91 sealing engages pipe elements connected by the valve coupling 10. As shown in FIGS. 5 and 5B, fifth and sixth ramp surfaces 93 and 95 may be positioned adjacent to one another on the outer surface 89 of lobe 85. Ramp surfaces 93 and 95 are contiguous along a third apex 97 which projects from the outer surface 89 of lobe 85. Ramp surfaces 93 and 95 are angularly oriented with respect to a third line 99 which extends from axis 34 to the third apex 97. Orientation angles 101 from about 45° to about 90° are feasible, with an orientation angle of about 74° being thought advantageous.

Figure 5E:
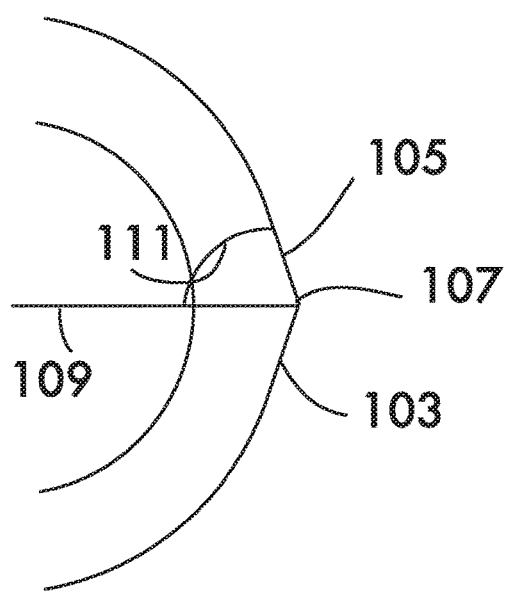

As shown in FIGS. 5 and 5E, the example seal 58 may also have seventh and eighth ramp surfaces 103 and 105 positioned adjacent to one another on outer surface 89 of lobe 85. Ramp surfaces 103 and 105 are contiguous along a fourth apex 107 projects outwardly from the outer surface 89. Ramp surfaces 103 and 105 are angularly oriented with respect to a fourth line 109 which extends radially from axis 34 to the apex 107. Orientation angles 111 from about 45° to about 90° are feasible, with an orientation angle of about 74° being thought advantageous. In this example embodiment the third and fourth apexes 97 and 107 are diametrically opposite to one another on lobe 85 as shown in FIG. 5. Further in this example, the first and third apexes 69 and 97 are aligned with one another along axis 34, and the second and fourth apexes 79 and 107 are aligned with one another along axis 34.

As shown in FIG. 5G, seal 58 may further comprise an inner ring 113 positioned between outer ring 61 and axis 34. Inner ring 113 is attached to the lobe 85 and defines oppositely facing surfaces 115 and 117.

Figure 5F:
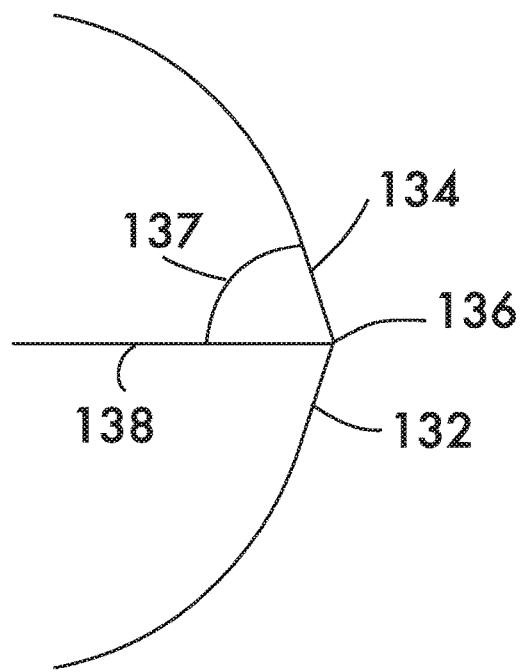

As further shown in FIGS. 5 and 5G, seal 58 may further comprise a rim 118 which extends circumferentially around a second side 120 of outer ring 61 opposite to lobe 85. Rim 118 has an outer surface 122 which faces away from axis 34 and is offset from outer surface 63 of outer ring 61. As shown in FIGS. 5 and 5C, ninth and tenth ramp surfaces 124 and 126 may be positioned adjacent to one another on the outer surface 122 of rim 118. Ramp surfaces 124 and 126 are contiguous along a fifth apex 128 which projects from the outer surface 122 of rim 118. Ramp surfaces 124 and 126 are angularly oriented with respect to a fifth line 130 extending radially from axis 34 to apex 128. Orientation angles 127 from about 45° to about 90° are feasible, with an orientation angle of about 80° being thought advantageous. As shown in FIGS. 5 and 5F, eleventh and twelfth ramp surfaces 132 and 134 may also be positioned adjacent to one another on the outer surface 122 of rim 118. Ramp surfaces 132 and 134 are contiguous along a sixth apex 136 which projects from the outer surface 122 of rim 118. Ramp surfaces 132 and 134 are angularly oriented with respect to a sixth line 138 extending radially from axis 34. Orientation angles 137 from about 45° to about 90° are feasible, with an orientation angle of about 80° being thought advantageous. In this example as shown in FIG. 5, the fifth and sixth apexes 128 and 136 are diametrically opposite to one another. The fifth apex 128 aligns with the first apex 69 and the sixth apex 136 aligns with the second apex 79.

Figure 6:
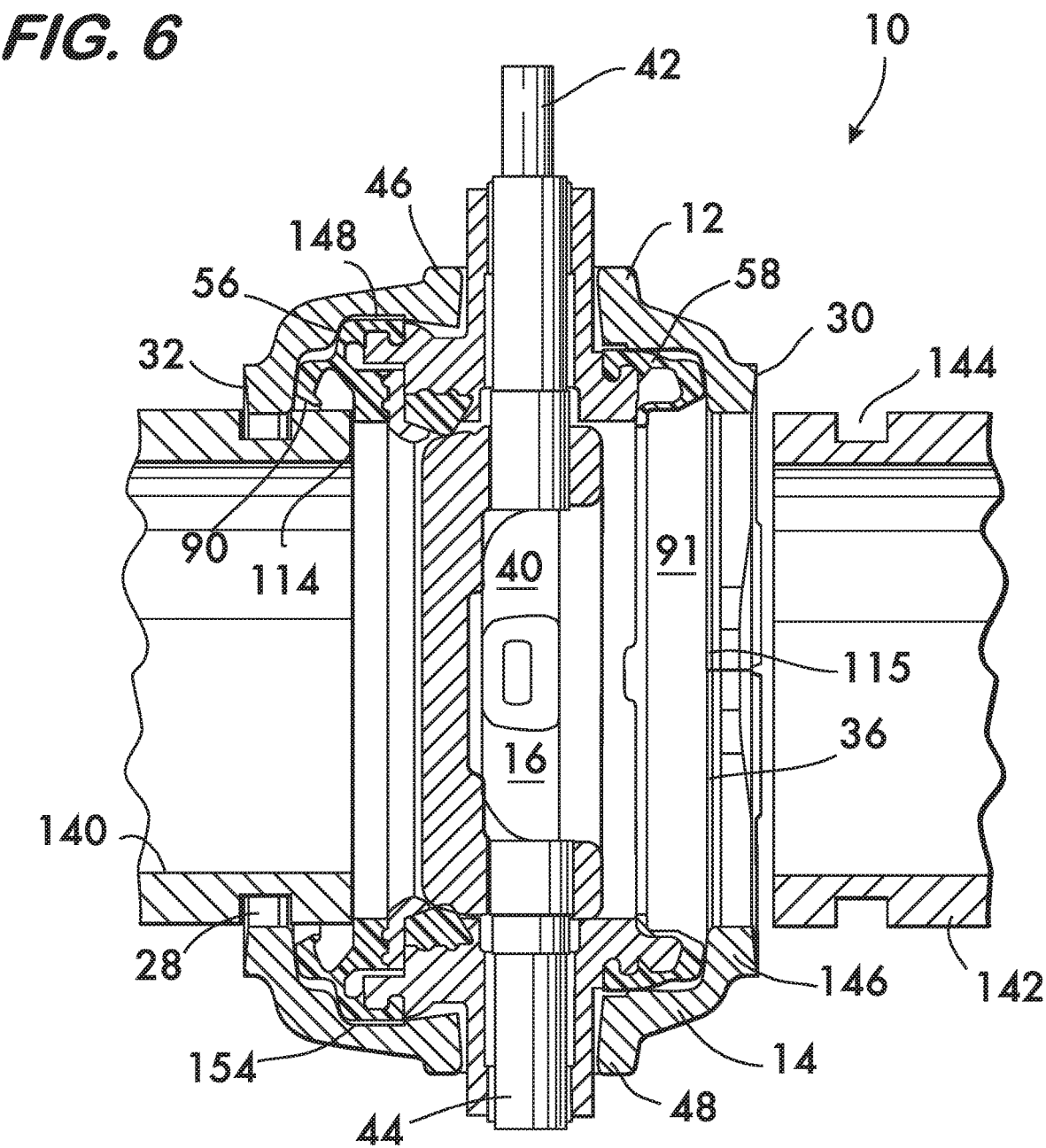
FIGS. 6 and 7 are longitudinal cross sectional views depicting formation of a joint between pipe elements using the example valve coupling of FIG. 1.
Figure 7:
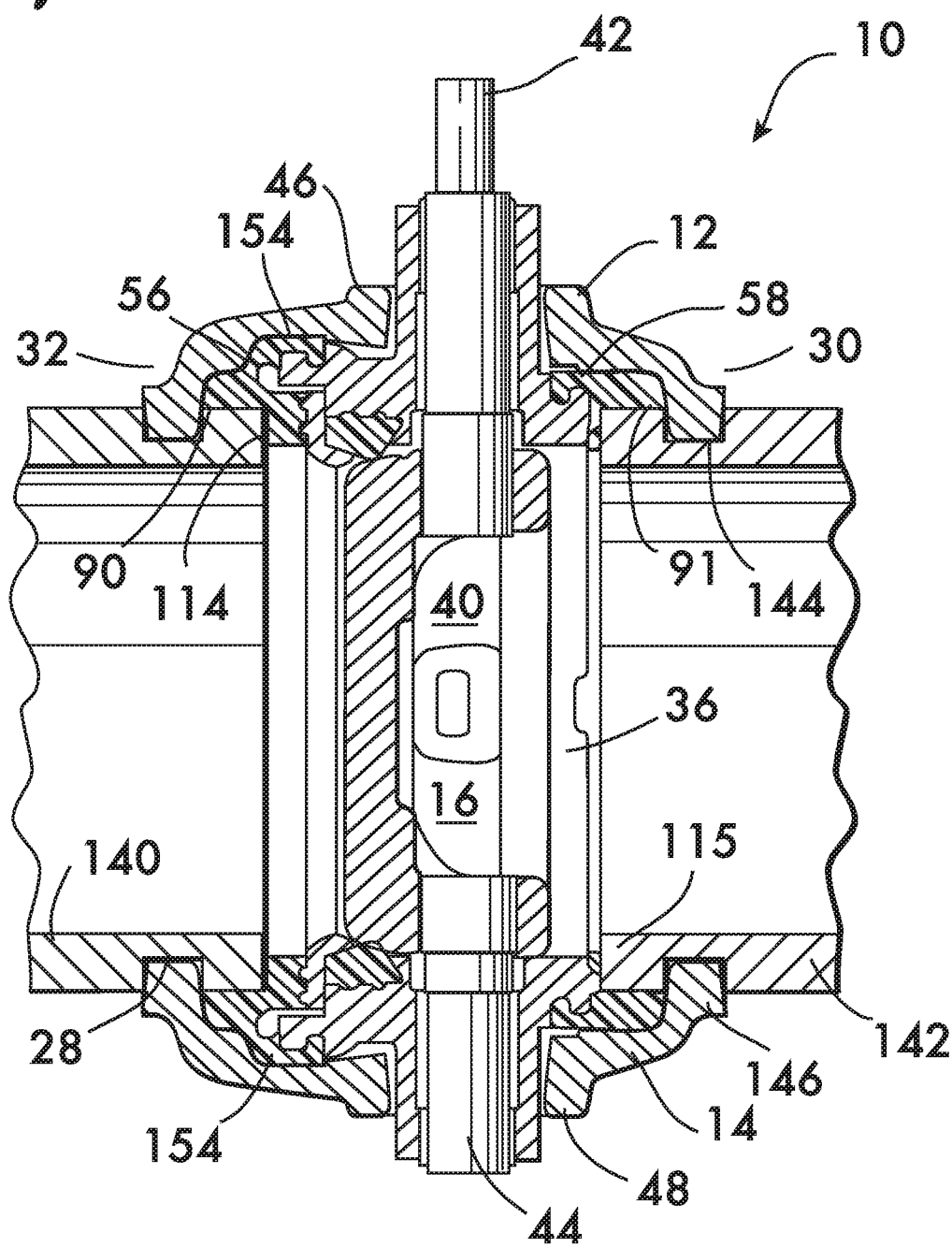

In use, as shown in FIG. 6, a valve coupling 10 is provided in a pre-assembled state (see also FIG. 1) with segments 12 and 14 positioned in spaced apart relation sufficient to permit insertion of pipe elements into the central space 16 without disassembling the valve coupling 10. Pipe elements 140 and 142 are then inserted into the central space 16 between the segments 12 and 14 and into respective engagement with seals 56 and 58. In this example, the pipe elements have circumferential grooves 144 that receive arcuate surfaces 28 on projecting keys 146 arrayed on opposite sides 30 and 32 of the segments. As shown in FIG. 7, the attachment members 18 (see also FIG. 1) are tightened to draw the segments 12 and 14 toward one another and into engagement with the pipe elements 140 and 142, the keys 146 engaging circumferential grooves 144 in the pipe elements. As the segments 12 and 14 are drawn toward one another the seals 56 and 58 are compressed between the segments, the valve body 36 and the pipe elements 140 and 142 to form a fluid tight joint. Lobe sealing surface 90 engages pipe element 140; lobe sealing surface 91 engages pipe element 142; the end of pipe element 140 engages surface 114 and the end of pipe element 142 engages surface 115.

Figure 8:
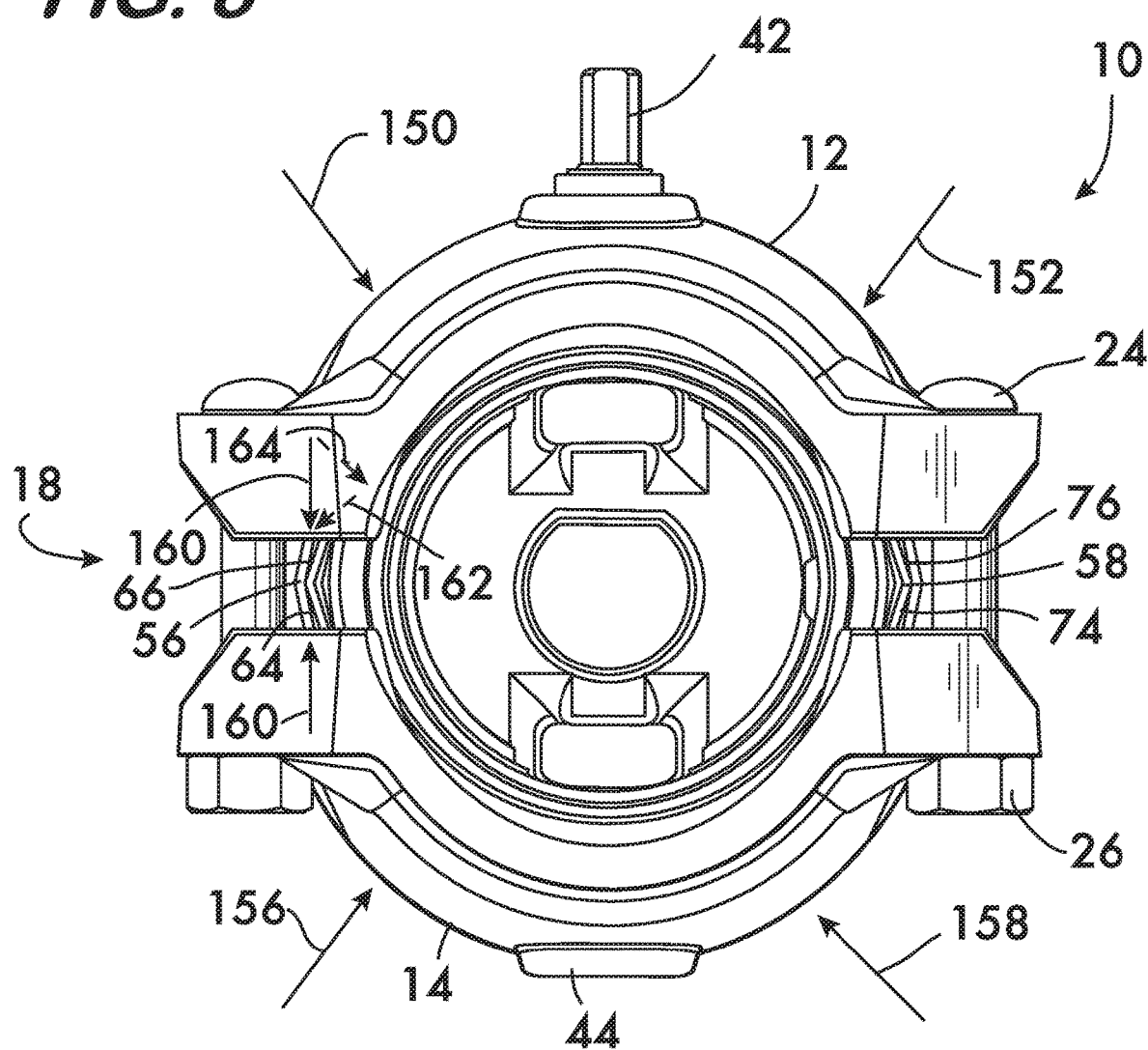
FIG. 8 is an axial view of the valve coupling shown in FIG. 1 in the pre-assembled state.
Figure 9:
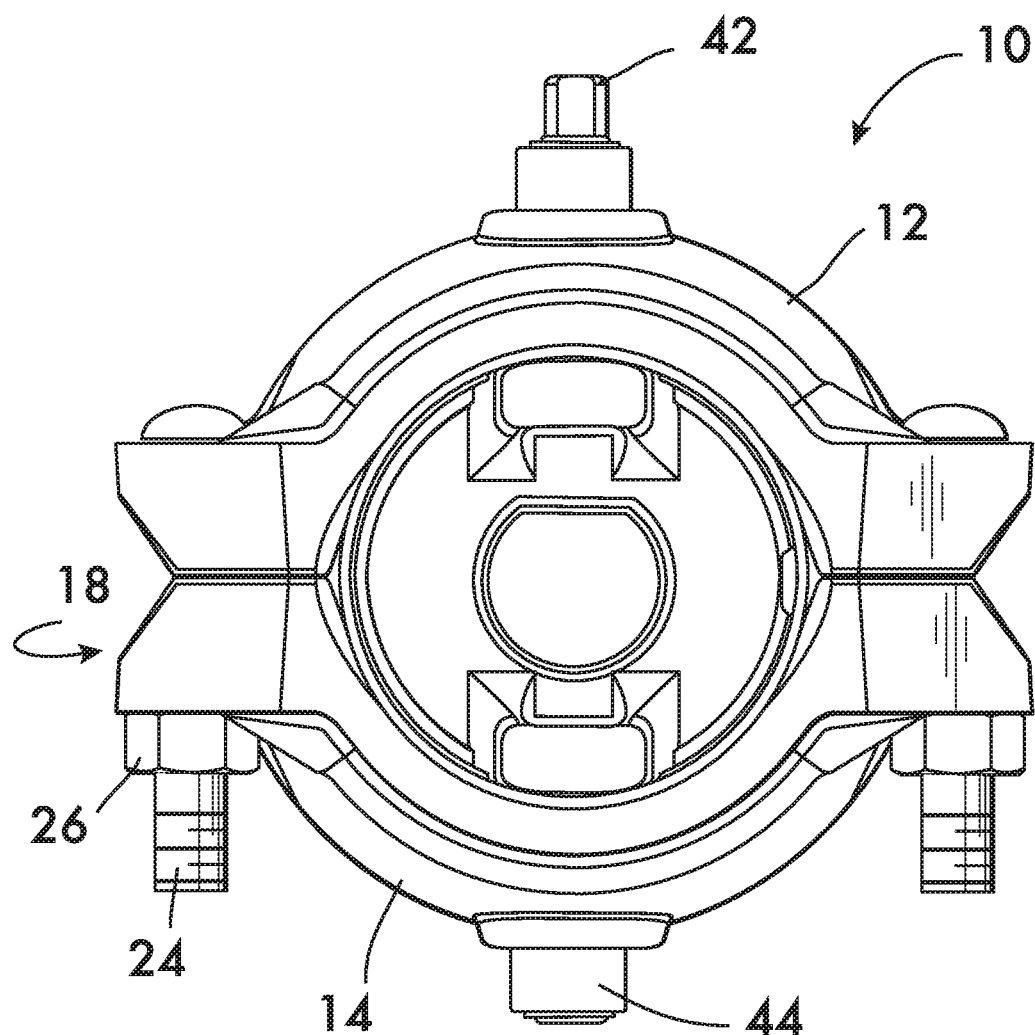
FIG. 9 is an axial view of the valve coupling shown in FIG. 1 when in use.

Seals 56 and 58 are not compressed uniformly as the segments 12 and 14 are drawn toward one another to form the joint. As described with reference to FIGS. 6 and 8, in the absence of one or more of the ramp surfaces 64, 66, 74, 76, 92, 94, 124, 126, 132 and 134, the inner surface of the back wall 148 of segment 12 would initially contact the seals 56 and 58 along substantially radially directed lines 150, 152 approximately at the ten o'clock and two o'clock positions respectively when the valve coupling 10 is viewed axially with the stems 42 and 44 at the twelve and six o'clock positions respectively. Similarly, the inner surface of the back wall 154 of segment 14 would initially contact seals 56 and 58 along radially directed lines 156 and 158 at the eight o'clock and four o'clock positions respectively. If the attachment members 18 were further tightened to draw the segments 12 and 14 further together, the lines of contact 150 and 156 between the inner surfaces of the back walls 148, 154 and the seals 56, 58 would move toward the nine o'clock position and the lines of contact 152 and 158 would move toward the three o'clock position (the three and nine o'clock positions located at the interfaces between the attachment members 18 on segments 12 and 14). Contact between the inner surface of the back walls 148, 154 and the seals 56 and 58 would be gradually established, first over the areas of the back wall between ten o'clock and two o'clock for segment 12, and between eight o'clock and four o'clock for segment 14. As shown in FIG. 9, generally uniform contact between the inner surface of back walls 148 and 154 and the seals 56 and 58 would be established once contact is made at the twelve and six o'clock locations.

If the segments 12 and 14 were drawn together in the absence of one or more of the ramp surfaces 64, 66, 74, 76, 92, 94, 124, 126, 132 and 134, the lines of contact 150, 156 and 152, 158 would move respectively toward the nine o'clock and three o'clock positions whereupon several factors might cause the seals 56 and 58 to be pinched between the segments 12 and 14 at the three and nine o'clock positions. For example, friction between the inner surface of back walls 148 and 154 and the seals 56 and 58 may cause pinching. Pinching may also be caused when the seals are distorted into an oval shape as the segments 12 and 14 ride along them as they are drawn to one another. Pinching can damage one or both of the seals 56 and 58 and prevent the formation of a fluid tight joint, necessitating replacement of the seals and dis-assembly and re-assembly of the joint. To mitigate or even obviate pinching it is advantageous to position one or more of the ramp surfaces 64, 66, 74, 76, 92, 94, 124, 126, 132 and 134 on the outer surfaces of seals 56 and 58 as shown in FIGS. 4 and 5 and described above. As shown in FIG. 4, the ramp surfaces are advantageously positioned in pairs diametrically opposite one another on the seal 56 to allow apexes 68, and 96 (when present) to be positioned at the nine o'clock position of the valve coupling 10, and apexes 78 and 106 (when present) to be positioned at the three o'clock position when seal 56 is installed between the segments 12 and 14 as shown in FIG. 8. Similarly, as shown in FIG. 5, the ramp surfaces are advantageously positioned in pairs diametrically opposite one another on the seal 58 to allow apexes 69, 97 (when present) and 128 (when present) to be positioned at the nine o'clock position of the valve coupling 10, and apexes 79, 107 (when present) and 134 (when present) to be positioned at the three o'clock position when seal 58 is installed between the segments 12 and 14. The ramp surfaces force initial contact between the inner surface of the back walls 148, 154 and the outer surfaces 62, 63 of the seals 56 and 58 nearer to the three and nine o'clock positions as the segments 12 and 14 are drawn toward one another and provide angularly oriented engagement surfaces that redirect a component of the tangential force between the segments and the seal radially inwardly. (The same is true for the other ramp surfaces 92, 94, 102, 104, 124, 126, 134, 136.) This redirection of the forces reduces the propensity of the seals 56 and 58 to be pinched between the segments 12 and 14 as they are drawn together. This action is illustrated in FIGS. 8 and 9, which show the valve coupling 10 as the segments 12 and 14 are drawn together. Tangential forces 160 acting at the nine o'clock and three o'clock positions between the segments 12 and 14 and the seals 56 and 58 become resolved into forces 162 along the ramp surfaces (for example, ramps 64 and 66, 74 and 76) and forces 164 perpendicular thereto. The resolution of the forces in this manner along with the ramps' tendency to force the initial contact closer to the 3 and 9 o'clock positions reduces the tendency of pinching the seals 56 and 58 between the segments 12 and 14. A further advantage is realized because the ramp surfaces also increase the compressive force exerted on the seals 56 and 58 by the segment 12 and 14 at the three and nine o'clock positions. In the absence of the ramp surfaces the compressive force between the segments 12 and 14 and the seals 56 and 58 falls off as one proceeds from the twelve or six o'clock positions to the three and nine o'clock positions. This is because the forces are substantially radially directed at twelve and six o'clock, but substantially tangential at three and nine o'clock. By redirecting the contact forces between the segments 12 and 14 and the seals 56 and 58, the ramp surfaces compensate for this non-uniform compression of the seal.

FIG. 9 shows the final configuration of the valve coupling 10 upon joint installation, the pipe elements not shown for clarity. Note that in this example embodiment the connection members 18 meet in what is known as "pad to pad" engagement when the valve coupling 10 is properly installed. This design is advantageous because it permits ready visual inspection confirming proper installation, and eliminates the need to tighten the bolts 24 to a specific torque value, though other styles of interface of the connection members known in the art may be used. Such styles include tongue-and-recess interfaces, or interfaces where the connection members do not contact and instead rely on a specified amount of torque exerted on the connection members through bolts or other means to maintain the valve coupling in its final configuration.

Figure 10:
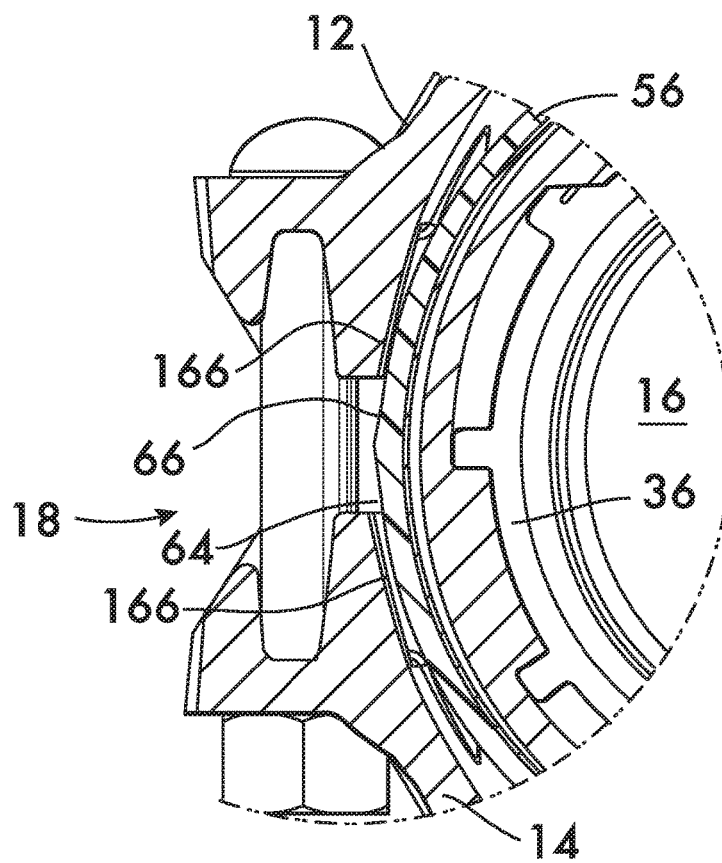
FIGS. 10 and 11 are partial cross sectional views of the example valve coupling shown respectively in FIGS. 1 and 9.
Figure 11:
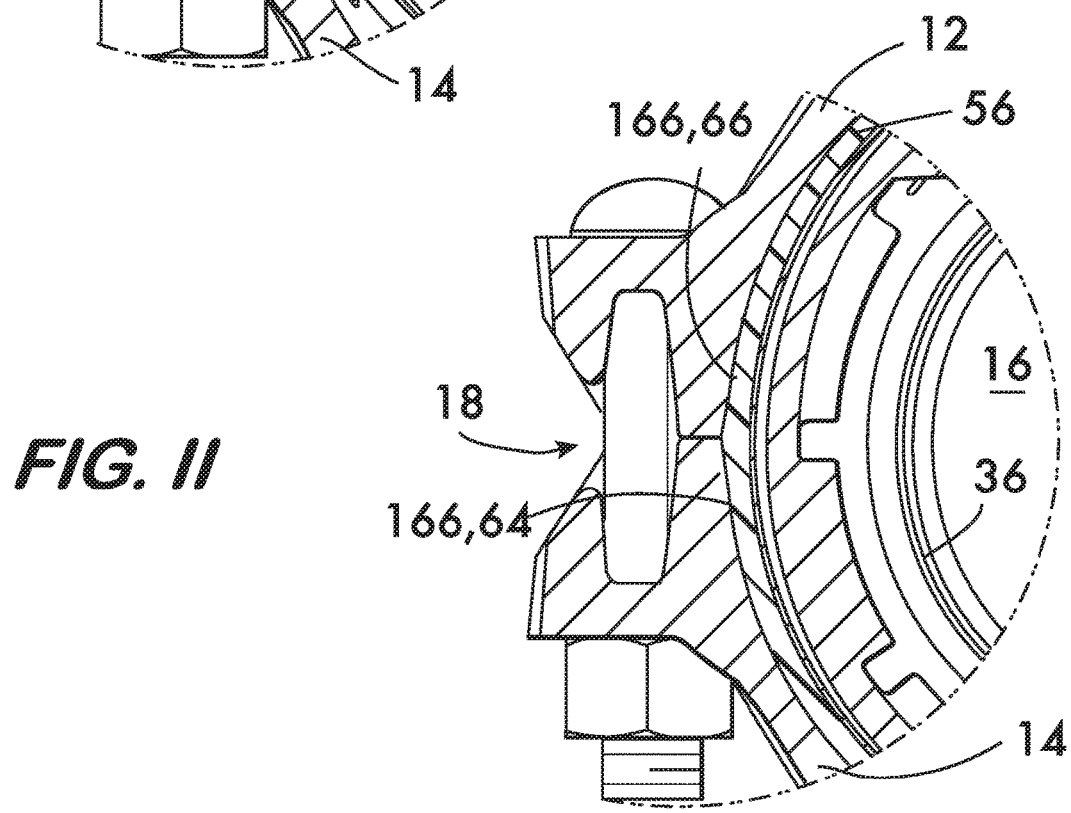

The angularly oriented ramp surfaces 64, 66, 74, 76, 92, 94, 124, 126, 132 and 134 on the outer surfaces of seals 56 and 58 as shown in FIGS. 4 and 5 provide numerous advantages. For example, angularly orienting ramp surfaces provide clearance between the seals 56 and 58 and segments 12 and 14 when the valve coupling is preassembled (see FIG. 1). Typically in a preassembled valve coupling, interference between the segments and seal near the three o'clock and nine o'clock areas forces the seal to collapse inward in the radial direction, forcing it out of round. An out of round seal may interfere with the pipe elements during installation. The ramp surfaces help mitigate this potential problem. Additionally, as shown in FIGS. 10 and 11, the ramp surfaces provide gradual compression of seals 56 and 58 (56 shown) via engagement with matching angled surfaces 166 on the segments 12 and 14. As the segments 12 and 14 are drawn toward one another to form a pipe joint, the angled surfaces 166 contact the ramp surfaces to radially compress the seals 56 and 58 (56 shown) at the three and nine o'clock positions. Typically, initial contact between the segments and seal without the ramp and angled surfaces would be a point or line contact, which could lead to pinching of the seal between the segments.

Depending on the specific geometry of the segments, it may not be possible to achieve uniform compression on the seal at the three and nine o'clock positions. A lack of uniform compression may result in lower maximum pressure limits, restricted thermal operating ranges, or require an increase in seal compression which may result in over compression in other areas. Compression of the seal at the three and nine o'clock positions via engaging ramp surfaces and angled surfaces 166 provides additional seal compression exactly where it is needed.

Figure 12:
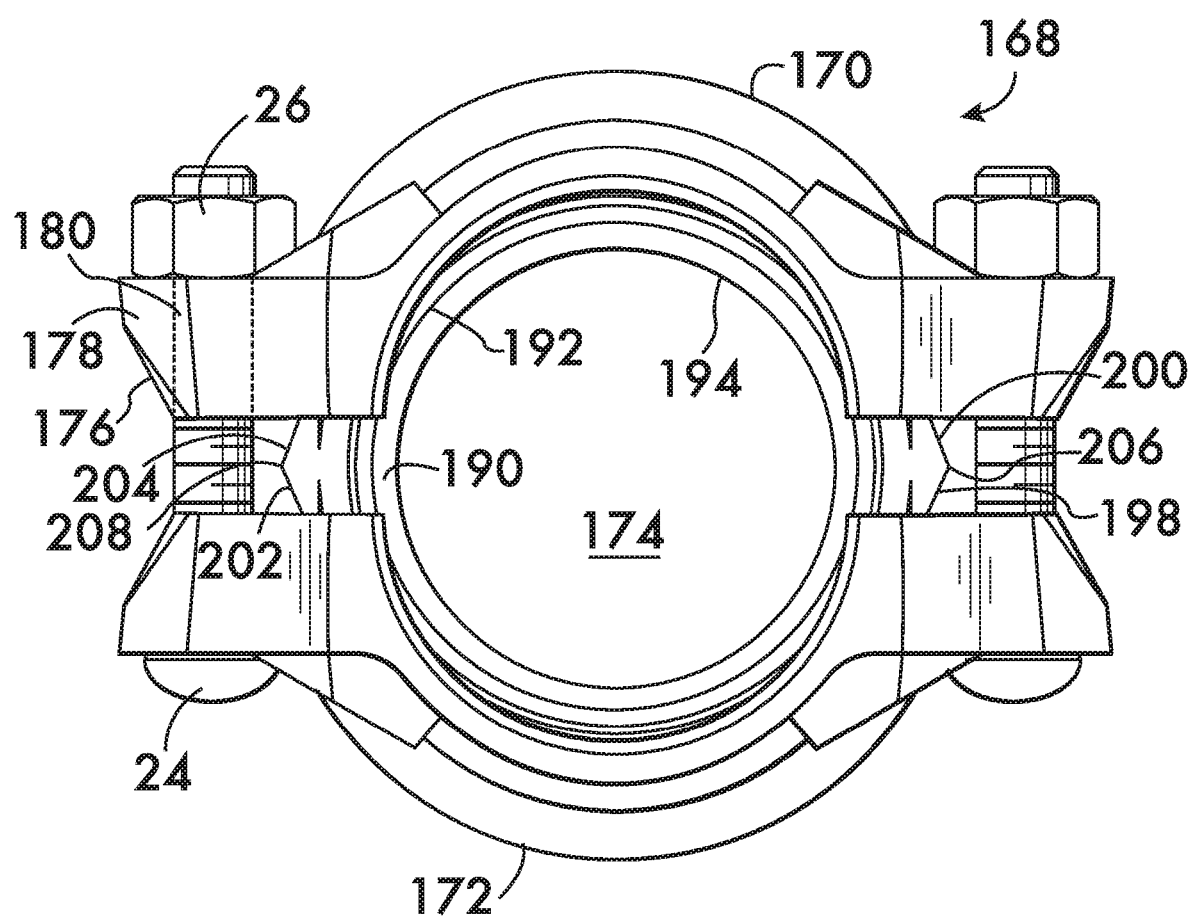
FIG. 12 is an axial view of an example embodiment of a coupling using an example seal according to the invention.
Figure 13:
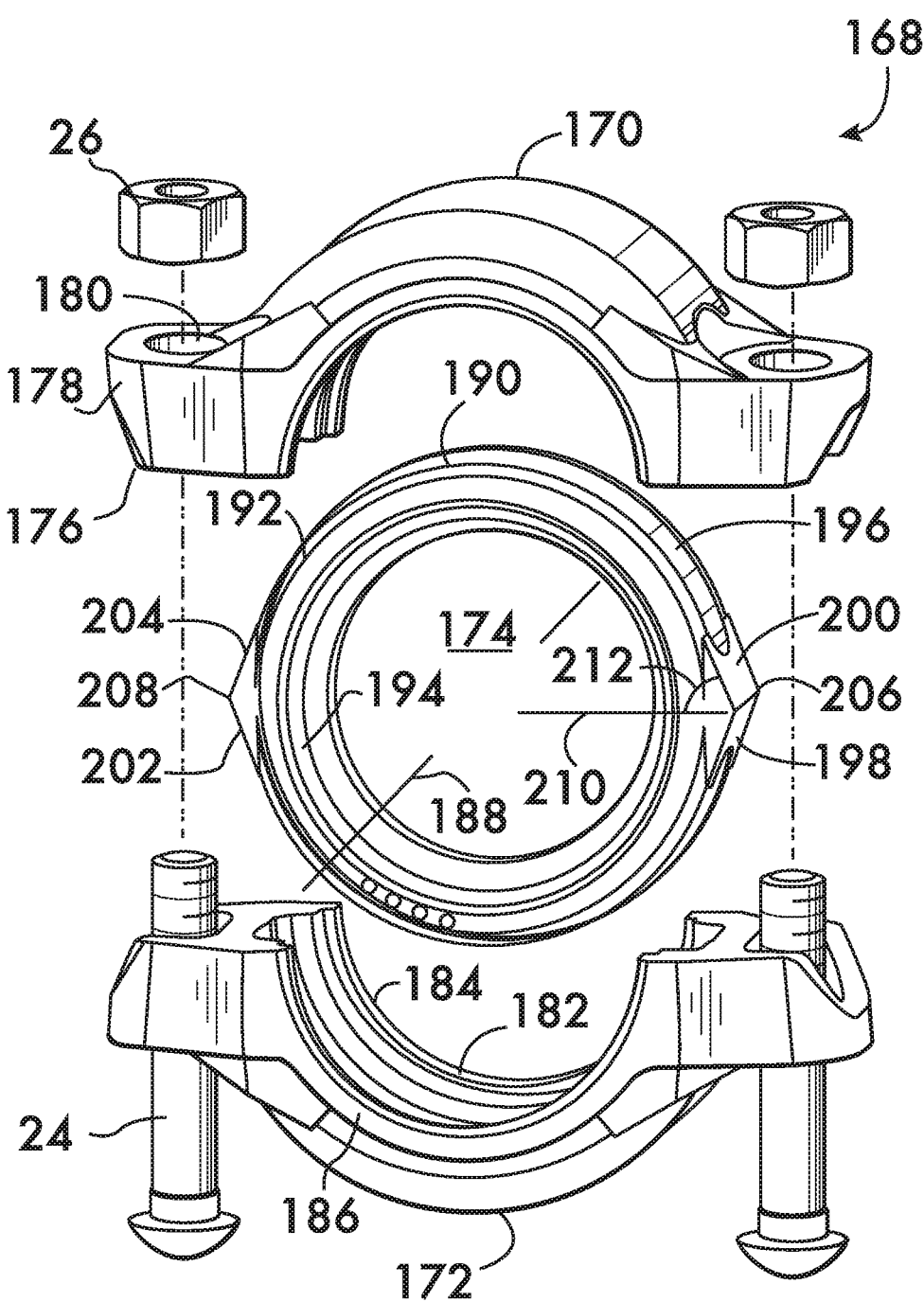
FIG. 13 is an exploded isometric view of the coupling and seal shown in FIG. 12.

While the seals 56 and 58 having ramp surfaces have been illustrated used with a valve coupling, it would be clear to one of skill in the art that the seal according to the invention would provide the same advantages to mechanical couplings that do not incorporate valves. An example embodiment of such a coupling 168 is shown in FIGS. 12 and 13. FIG. 12 shows the coupling 168 in the preassembled state as would be received by the user. Coupling 168 comprises a plurality of segments, in this example, first and second segments 170 and 172 attached to one another end to end about a central space 174. The segments are held in spaced relation sufficient to permit pipe elements to be inserted into the central space 174 (as described for valve coupling 10 with reference to FIGS. 6 and 7). Attachment of segments 170 and 172 is effected by adjustable attachment members 176 located at each end of each segment. In this example the attachment members comprise lugs 178 which extend outwardly from the segments 170 and 172, the lugs having holes 180 that receive adjustable fasteners, such as bolts 24 and nuts 26. Tightening of the nuts 26 draws the segments 170 and 172 toward one another.

As shown in FIG. 13, segments 170 and 172 each have arcuate surfaces 182 positioned on opposite sides 184 and 186 of the segments. Arcuate surfaces 182 face a longitudinal axis 188 that passes through the central space 174 and are engageable with pipe elements when they are inserted between the segments 170 and 172 and into central space 174 as described below. As shown, the arcuate surfaces 182 may comprise projections, known as "keys", which project toward axis 188 and engage circumferential grooves in the pipe elements upon tightening of the attachment members 176 to provide mechanical engagement, securing the pipe elements in end to end relation to form a joint. The keys may also engage pipe elements having plain end, or ends having a shoulder and/or a bead as are known in the art.

The segments are supported in spaced relation by the seal 190. In the example embodiment shown in FIG. 13, seal 190 comprises a ring 192 having circumferentially extending sealing surfaces 194 on opposite sides of the seal. Sealing surfaces 194 face axis 188 and are sealingly engageable with pipe elements when they are inserted into the central space 174. Ring 192 further comprises an outer surface 196 on which ramp surfaces 198, 200, 202 and 204 are positioned. The ramp surfaces 198 and 200 are contiguous at an apex 206 which extends outwardly away from axis 188. Similarly, ramp surfaces 202 and 204 are contiguous at an apex 208 which extends outwardly away from axis 188. The ramps 198 and 200 and their apex 206 are positioned diametrically opposite to ramps 202 and 204 and their apex 208. The ramp surfaces are angularly oriented with respect to a line 210 extending radially from axis 188 to respective apexes. Orientation angles 212 from about 45° to about 90° are feasible, with an orientation angle of about 80° being considered advantageous.

When segments 170 and 172 are assembled to form the coupling 168 the seal 190 is positioned between the segments such that the apexes 206 and 208 are at the 3 o'clock and 9 o'clock positions adjacent to the attachment members 176 as shown in FIG. 12. In this position the ramps 198, 200, 202 and 204 mitigate or prevent pinching of seal 190 by determining where the segments 170 and 172 will initially contact the seal (near the 3 and 9 o'clock positions) and advantageously resolving the contact forces into force components normal to the ramp surfaces and force components along the ramp surfaces as described above for valve coupling 10.

What is claimed is:

1. In combination, a seal and a coupling for joining pipe elements, said seal comprising:
   an outer ring surrounding an axis oriented coaxially with said outer ring, said outer ring having an outer surface facing away from said axis;
   first and second ramp surfaces monolithically formed with said outer ring, said first and second ramp surfaces positioned adjacent to one another on said outer surface, said first and second ramp surfaces being contiguous along a first apex projecting outwardly from said outer surface, said first and second ramp surfaces being angularly oriented with respect to a first line extending radially from said axis to said first apex, and
   said coupling comprising:
   a plurality of segments attached to one another end to end surrounding and in direct contact with said seal, said segments fully enclosing said seal within a central space defined by said segments, each said segment having attachment members located at opposite ends, each said segment having arcuate surfaces positioned on opposite sides thereof for engagement with said pipe elements.

2. The seal according to claim 1, further comprising third and fourth ramp surfaces positioned adjacent to one another on said outer surface, said third and fourth ramp surfaces being contiguous along a second apex projecting outwardly from said outer surface, said third and fourth ramp surfaces being angularly oriented with respect to a second line extending radially from said axis to said second apex.

3. The seal according to claim 2, wherein said first and second apexes are diametrically opposite to one another.

4. The seal according to claim 3, further comprising:
   a lobe extending circumferentially around a first side of said outer ring, said lobe having an outer surface facing away from said axis and a sealing surface facing toward said axis.

5. The seal according to claim 4, further comprising fifth and sixth ramp surfaces positioned adjacent to one another on said outer surface of said lobe, said fifth and sixth ramp surfaces being contiguous along a third apex projecting from said outer surface of said lobe, said fifth and sixth ramp surfaces being angularly oriented with respect to a third line extending radially from said axis to said third apex.

6. The seal according to claim 5, wherein said first and third apexes are aligned with one another.

7. The seal according to claim 5, further comprising seventh and eighth ramp surfaces positioned adjacent to one another on said outer surface of said lobe, said seventh and eighth ramp surfaces being contiguous along a fourth apex projecting from said outer surface of said lobe, said seventh and eighth ramp surfaces being angularly oriented with respect to a fourth line extending radially from said axis to said fourth apex.

8. The seal according to claim 7, wherein said second and fourth apexes are aligned with one another.

9. The seal according to claim 7, further comprising:
a rim extending circumferentially around a side of said outer ring opposite said lobe, said rim having an outer surface facing away from said axis and offset from said outer surface of said outer ring;
ninth and tenth ramp surfaces positioned adjacent to one another on said outer surface of said rim, said ninth and tenth ramp surfaces being contiguous along a fifth apex projecting from said outer surface of said rim, said ninth and tenth ramp surfaces being angularly oriented with respect to a fifth line extending radially from said axis to said fifth apex.

10. The seal according to claim 9, further comprising eleventh and twelfth ramp surfaces positioned adjacent to one another on said outer surface of said rim, said eleventh and twelfth ramp surfaces being contiguous along a sixth apex projecting from said outer surface of said rim, said eleventh and twelfth ramp surfaces being angularly oriented with respect to a sixth line extending radially from said axis to said sixth apex.

11. The seal according to claim 10, wherein said fifth and sixth apexes are diametrically opposite one another.

12. The seal according to claim 11, wherein said fifth apex is aligned with said first apex and said sixth apex is aligned with said second apex.

13. The seal according to claim 4, further comprising an inner ring positioned between said outer ring and said axis, said inner ring being attached between said outer ring and said lobe and defining oppositely facing surfaces oriented perpendicular to said axis.

14. The seal according to claim 4, further comprising an inner ring positioned between said outer ring and said axis, said inner ring being attached to said lobe and defining oppositely facing surfaces oriented perpendicular to said axis.

15. In combination, a seal and a coupling for joining pipe elements, said seal comprising:
an outer ring surrounding an axis oriented coaxially with said outer ring, said outer ring having an outer surface facing away from said axis;
first and second ramp surfaces monolithically formed with said outer ring, said first and second ramp surfaces positioned adjacent to one another on said outer surface, said first and second ramp surfaces being contiguous along a first apex projecting outwardly from said outer surface, said first and second ramp surfaces being angularly oriented with respect to a first line extending radially from said axis to said first apex;
third and fourth ramp surfaces positioned adjacent to one another on said outer surface, said third and fourth ramp surfaces being contiguous along a second apex projecting outwardly from said outer surface, said third and fourth ramp surfaces being angularly oriented with respect to a second line extending radially from said axis to said second apex,
wherein said first and second apexes are diametrically opposite to one another; and
said coupling comprising:
a plurality of segments attached to one another end to end surrounding and in direct contact with said seal, said segments fully enclosing said seal within a central space defined by said segments, each said segment having attachment members located at opposite ends, each said segment having arcuate surfaces positioned on opposite sides thereof for engagement with said pipe elements.

16. The seal according to claim 15, further comprising:
a lobe extending circumferentially around a first side of said outer ring, said lobe having an outer surface facing away from said axis and a sealing surface facing toward said axis;
fifth and sixth ramp surfaces positioned adjacent to one another on said outer surface of said lobe, said fifth and sixth ramp surfaces being contiguous along a third apex projecting from said outer surface of said lobe, said fifth and sixth ramp surfaces being angularly oriented with respect to a third line extending radially from said axis to said third apex; and
seventh and eighth ramp surfaces positioned adjacent to one another on said outer surface of said lobe, said seventh and eighth ramp surfaces being contiguous along a fourth apex projecting from said outer surface of said lobe, said seventh and eighth ramp surfaces being angularly oriented with respect to a fourth line extending radially from said axis to said fourth apex.

17. The seal according to claim 16, wherein said first and third apexes are aligned with one another and said second and fourth apexes are aligned with one another.

18. The seal according to claim 16, further comprising:
a rim extending circumferentially around a side of said outer ring opposite said lobe, said rim having an outer surface facing away from said axis and offset from said outer surface of said outer ring;
ninth and tenth ramp surfaces positioned adjacent to one another on said outer surface of said rim, said ninth and tenth ramp surfaces being contiguous along a fifth apex projecting from said outer surface of said rim, said ninth and tenth ramp surfaces being angularly oriented with respect to a fifth line extending radially from said axis to said fifth apex;
eleventh and twelfth ramp surfaces positioned adjacent to one another on said outer surface of said rim, said eleventh and twelfth ramp surfaces being contiguous along a sixth apex projecting from said outer surface of said rim, said eleventh and twelfth ramp surfaces being angularly oriented with respect to a sixth line extending radially from said axis to said sixth apex; wherein
said fifth and sixth apexes are diametrically opposite one another.

19. The seal according to claim 18, wherein said third and fifth apexes are aligned with said first apex and said fourth and sixth apexes are aligned with said second apex.

20. The seal according to claim 16, further comprising an inner ring positioned between said outer ring and said axis, said inner ring being attached between said outer ring and said lobe and defining oppositely facing surfaces oriented perpendicular to said axis.

21. The seal according to claim 16, further comprising an inner ring positioned between said outer ring and said axis, said inner ring being attached to said lobe and defining oppositely facing surfaces oriented perpendicular to said axis.

22. In combination, a seal and a coupling for joining pipe elements, said seal comprising:
an outer ring surrounding an axis oriented coaxially with said outer ring, said outer ring having an outer surface facing away from said axis;
first and second ramp surfaces monolithically formed with said outer ring, said first and second ramp surfaces positioned adjacent to one another on said outer surface, said first and second ramp surfaces being contiguous along a first apex projecting outwardly from said outer surface, said first and second ramp surfaces being angularly oriented with respect to a first line extending radially from said axis to said first apex;

third and fourth ramp surfaces positioned adjacent to one another on said outer surface, said third and fourth ramp surfaces being contiguous along a second apex projecting outwardly from said outer surface, said third and fourth ramp surfaces being angularly oriented with respect to a second line extending radially from said axis to said second apex, said first and second apexes being diametrically opposite to one another; and said coupling comprising:

a plurality of segments attached to one another end to end surrounding and in direct contact with said seal, said segments fully enclosing said seal within a central space defined by said segments, each said segment having attachment members located at opposite ends, each said segment having arcuate surfaces positioned on opposite sides thereof for engagement with said pipe elements.

23. The combination according to claim 22, wherein said attachment members comprise lugs extending outwardly from opposite ends of each said segment, each said lug defining a hole for receiving a fastener.

24. The combination according to claim 22, wherein said arcuate surfaces project from said segments radially toward said axis.

25. The combination according to claim 22, further comprising:

a lobe extending circumferentially around a first side of said outer ring, said lobe having an outer surface facing away from said axis and a sealing surface facing toward said axis for engagement with one of said pipe elements;

fifth and sixth ramp surfaces positioned adjacent to one another on said outer surface of said lobe, said fifth and sixth ramp surfaces being contiguous along a third apex projecting from said outer surface of said lobe, said fifth and sixth ramp surfaces being angularly oriented with respect to a third line extending radially from said axis to said third apex; and seventh and eighth ramp surfaces positioned adjacent to one another on said outer surface of said lobe, said seventh and eighth ramp surfaces being contiguous along a fourth apex projecting from said outer surface of said lobe, said seventh and eighth ramp surfaces being angularly oriented with respect to a fourth line extending radially from said axis to said fourth apex.

26. The combination according to claim 25, wherein said first and third apexes are aligned with one another and said second and fourth apexes are aligned with one another.

27. The combination according to claim 25, further comprising:

a rim extending circumferentially around a side of said outer ring opposite said lobe, said rim having an outer surface facing away from said axis and offset from said outer surface of said outer ring;

ninth and tenth ramp surfaces positioned adjacent to one another on said outer surface of said rim, said ninth and tenth ramp surfaces being contiguous along a fifth apex projecting from said outer surface of said rim, said ninth and tenth ramp surfaces being angularly oriented with respect to a fifth line extending radially from said axis to said fifth apex;

eleventh and twelfth ramp surfaces positioned adjacent to one another on said outer surface of said rim, said eleventh and twelfth ramp surfaces being contiguous along a sixth apex projecting from said outer surface of said rim, said eleventh and twelfth ramp surfaces being angularly oriented with respect to a sixth line extending radially from said axis to said sixth apex; wherein said fifth and sixth apexes are diametrically opposite one another.

28. The combination according to claim 27, wherein said third and fifth apexes are aligned with said first apex and said fourth and sixth apexes are aligned with said second apex.

29. The combination according to claim 25, further comprising:

a valve body positioned between said outer ring and said axis;

a valve closing member positioned within said valve body, said valve closing member being movable between a closed position and an open position; and a valve stem attached to said valve closing member and extending through one of said segments.

30. The combination according to claim 29, further comprising an inner ring positioned between said outer ring and said axis, said inner ring being attached between said outer ring and said lobe and defining oppositely facing surfaces oriented perpendicular to said axis, one of said oppositely facing surfaces being engageable with an end of one of said pipe elements, the other of said oppositely facing surfaces being engageable with said valve body.

31. The combination according to claim 29, further comprising an inner ring positioned between said outer ring and said axis, said inner ring being attached to said lobe and defining oppositely facing surfaces oriented perpendicular to said axis, one of said oppositely facing surfaces being engageable with an end of one of said pipe elements, the other of said oppositely facing surfaces being engageable with said valve body.

32. The combination according to claim 22, wherein said plurality of segments comprises no more than two said segments, each of said segments comprising:

a back wall extending between said opposite ends, said back wall having an inner surface facing said axis;

first and second angularly oriented surfaces positioned on said inner surface of said back wall at opposite ends of said segments.

* * * * *